(12) United States Patent
Shramkova et al.

(10) Patent No.: US 12,235,464 B2
(45) Date of Patent: Feb. 25, 2025

(54) DEVICE FOR NEAR-FIELD FOCUSING AND BEAM FORMING

(71) Applicant: InterDigital CE Patent Holdings, Paris (FR)

(72) Inventors: Oksana Shramkova, Cesson-Sévigné (FR); Mitra Damghanian, Cesson-Sévigné (FR); Valter Drazic, Betton (FR); Laurent Blonde, Thorigné-Fouillard (FR); Artem Boriskin, Thorigné-Fouillard (FR)

(73) Assignee: InterDigital CE Patent Holdings, Paris (FR)

( * ) Notice: Subject to any disclaimer, the term of this patent is extended or adjusted under 35 U.S.C. 154(b) by 806 days.

(21) Appl. No.: 17/282,348

(22) PCT Filed: Oct. 1, 2019

(86) PCT No.: PCT/EP2019/076608
§ 371 (c)(1),
(2) Date: Apr. 1, 2021

(87) PCT Pub. No.: WO2020/070135
PCT Pub. Date: Apr. 9, 2020

(65) Prior Publication Data
US 2021/0389597 A1 Dec. 16, 2021

(30) Foreign Application Priority Data
Oct. 1, 2018 (EP) .................................... 18198001

(51) Int. Cl.
*G02B 27/09* (2006.01)
(52) U.S. Cl.
CPC ....... *G02B 27/095* (2013.01); *G02B 27/0927* (2013.01)

(58) Field of Classification Search
CPC .............. G02B 27/095; G02B 27/0927; G02B 2207/101; G02B 27/56
See application file for complete search history.

(56) References Cited

U.S. PATENT DOCUMENTS 7,394,535 B1 7/2008 Chen
8,003,965 B2 8/2011 Grbic
(Continued)

FOREIGN PATENT DOCUMENTS

CN 101793982 A 8/2010
CN 204009237 U 12/2014
(Continued)

OTHER PUBLICATIONS

Kong, Soon-Cheol, et. al., "Photonic Nanojet-Enabled Optical Data Storage". Optical Society of America, Optics Express, vol. 16, No. 18, Sep. 1, 2008, pp. 13713-13719.
(Continued)

*Primary Examiner* — Wyatt A Stoffa
*Assistant Examiner* — Ray Alexander Dean
(74) *Attorney, Agent, or Firm* — Klintworth & Rozenblat IP LLP

(57) ABSTRACT

An optically-transparent device (100) is disclosed which comprises a main part (10) of dielectric material having a refractive index $n_2$, said device being configured for forming a field intensity distribution in a near zone of said device from electromagnetic waves incidentally illuminating said device, when said device is embedded into a dielectric material having a refractive index $n_1$ lower than said refractive index $n_2$. Said device (100) further comprises at least one insert (11) of dielectric material having a refractive index $n_3$ higher than said refractive index $n_2$, said at least one insert being at least partly inserted into said main part, said refractive index $n_1$ being different from said refractive index (Continued)

Figure 1:
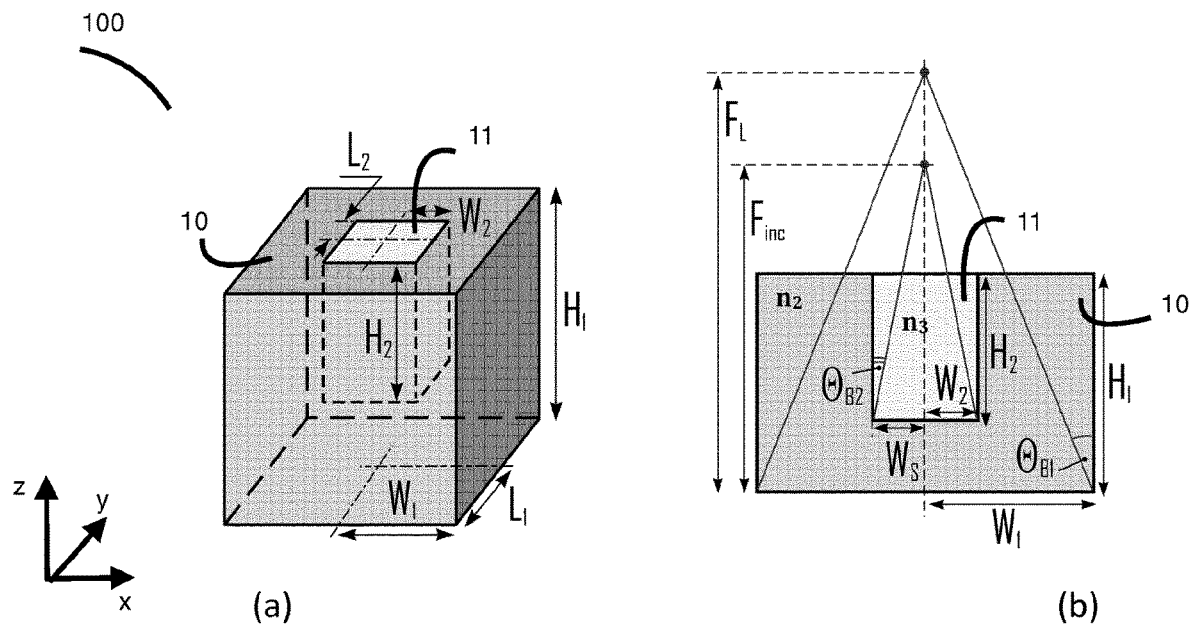

$n_3$, and wherein Formula (I) with $W_2$ being a half width of said insert and Formula (II), Formula (III) with $W_1$ being a half width of said main part and Formula (IV), with $\lambda$ being the wavelength of the electromagnetic wave propagating in the dielectric material having refractive index $n_1$.

20 Claims, 13 Drawing Sheets

(56) References Cited

U.S. PATENT DOCUMENTS

| | | | |
|---|---|---|---|
| 8,554,031 B2 | 10/2013 | Astratov | |
| 8,953,064 B1 | 2/2015 | Ng | |
| 2004/0263860 A1 | 12/2004 | Johnson | |
| 2007/0115787 A1 | 5/2007 | Itagi | |
| 2011/0235166 A1 | 9/2011 | Zhu | |
| 2013/0308127 A1 | 11/2013 | Bisht | |
| 2014/0111677 A1 | 4/2014 | Fukuda | |
| 2015/0248790 A1 | 9/2015 | Schowengerdt | |
| 2016/0054172 A1* | 2/2016 | Roh | H01L 27/14629 250/208.2 |
| 2016/0274281 A1 | 9/2016 | Lutolf | |

FOREIGN PATENT DOCUMENTS

| | | | |
|---|---|---|---|
| CN | 105765421 A | 7/2016 | |
| CN | 107229096 | 10/2017 | |
| EP | 3223062 A1 * | 9/2017 | B82Y 20/00 |
| EP | 3223063 A1 | 9/2017 | |
| EP | 3312646 A1 | 4/2018 | |
| EP | 3312660 A1 * | 4/2018 | G02B 27/0927 |
| EP | 3433663 A1 | 1/2019 | |
| EP | 3688520 A1 | 8/2020 | |
| EP | 3765873 A1 | 1/2021 | |
| RU | 161592 U1 | 4/2016 | |
| RU | 178616 U1 | 4/2018 | |
| TW | 200741686 A | 11/2007 | |
| WO | 2016020831 A1 | 2/2016 | |
| WO | 2017162880 A1 | 9/2017 | |
| WO | 2018073426 A1 | 4/2018 | |
| WO | 2018122267 A1 | 7/2018 | |

OTHER PUBLICATIONS

Pacheco-Peña, V., et. al., "Terajets Produced by Dielectric Cuboids". Applied Physics Letters 105, 084102, (2014), doi: 10.1063/1.4894243, 5 pages.

Heifetz, Alexander, et. al., "Subdiffraction Optical Resolution of a Gold Nanosphere Located Within the Nanojet of a Mie-Resonant Dielectric Microsphere". Optical Express, vol. 15, No. 25, (2007), 17334-17342.

Devilez, Alexis, et. al., "Three-Dimensional Subwavelength Confinement of Light With Dielectric Microspheres". Optical Express, vol. 17, No. 4, (2009), 2089-2094.

Shen, Yuecheng, et. al., "Ultralong Photonic Nanojet Formed by a Two-Layer Dielectric Microsphere". Optical Letters, Optical Society of America, vol. 39, No. 14, Jul. 15, 2014, 4120-4123.

Ruiz, César Méndez, et al., "Detection of Embedded Ultrasubwavelength-Thin Dielectric Features Using Elongated Photonic Nanojets". Optical Express, vol. 18, No. 16, Aug. 2, 2010, pp. 16805-16812.

Geints, Yuri E., et. al., "Photonic Nanojet Calculations in Layered Radially Inhomogeneous Micrometer-Sized Spherical Particles". Optical Society of America, vol. 28, No. 8, Aug. 2011, 1825-1830.

Gu, Guoqiang, et. al. "Super-Long Photonic Nanojet Generated from Liquid-Filled Hollow Microcylinder". Optical Society of America, Optical Letters, vol. 40, No. 4, Feb. 15, 2015, pp. 625-628.

International Search Report and Written Opinion of the International Searching Authority for PCT/EP2019/076608 mailed Dec. 19, 2019, 11 pages.

Pacheco-Peña, V., et. al., "Multifrequency Focusing and Wide Angular Scanning of Terajets". Optical Society of America, Optics Letters, vol. 40, No. 2, (2015), 5 pages.

International Search Report and Written Opinion of the International Searching Authority for PCT/EP2019/076596 mailed Dec. 20, 2019, 14 pages.

Itagi, A. V., et. al., , "Optics of Photonic Nanojets". Optical Society of America. J. Opt. Soc. Am. A , Vo.22, Dec. 2005 pp. 2847-2858 (12 pages).

International Preliminary Report on Patentability for PCT/EP19/076608 mailed Apr. 15, 2021, 9 pages.

International Preliminary Report on Patentability for PCT/EP2019/076596 mailed Apr. 15, 2021, 11 pages.

Zhao, Y. et. al., "Beam Bending Via Plasmonic Lenses". Optics Express, vol. 18, No. 22, Oct. 25, 2010, pp. 23458-23465 (8 pages).

Kress, Bernard, et. al., "A Review of Head-Mounted Displays (HMD) Technologies and Applications for Consumer Electronics". Proceedings of SPIE, vol. 8720, (2013), pp. 87200A-1-87200A-13 (13 pages).

Novotny, Lukas, et. al., "Near-field Optical Microscopy and Spectroscopy with Pointed Probes". Annual Review of Physical Chemistry, vol. 57, (2006) pp. 303-331 (29 pages).

Tirosh, Udi, "New Flat Lenses Technology Could Offer Smaller Lenses With Zero Chromatic Aberration". DIY Photography, Feb. 20, 2015, 8 pages.

Darafsheh, Arash, et al., "The effect of the background medium in microsphere-assisted microscopy", Proceedings of the SPIE—Progress in Biomedical Optics and Imaging, vol. 1007, 2017, 6 pages.

Chen, Y., et. al., "Engineering The Phase Front of Light With Phase-Change Material Based Planar Lenses". Scientific Reports vol. 5, No. 1, Mar. 2, 2015, pp. 1-7 (7 pages).

Mao, X., et. al., "Tunable Photonic Nanojet Formed by Generalized Luneburg Lens". Optics Express, vol. 23, No. 20, 2015, pp. 26426-26433 (8 pages).

Mukawa, Hiroshi, et. al., "A Full-Color Eyewear Display Using Planar Waveguides with Reflection Volume Holograms". Journal of the Society for Information Display (SID), vol. 17, No. 3, (2009), pp. 185-193 (9 pages).

Gu, Yinghong, et. al., "Color Generation Via Subwavelength Plasmonic Nanostructures". Nanoscale, vol. 7, (2015), pp. 6409-6419 (11 pages).

Liu, Z., et. al., "Tuning the Focus of a Plasmonic Lens by the Incident Angle". Applied Physics Letters, vol. 88, No. 17, 2006, pp. 171108-1-171108-2 (3 pages).

Hua, Hong, et. al., "A 3D Integral Imaging Optical See-Through Head-Mounted Display". Optical Society of America, Optics Express, vol. 22, No. 11, Jun. 2, 2014, pp. 13484-13491, (8 pages).

Heifetz, Alexander, et. al., "Photonic Nanojets". Journal of Computational Theoretical Nanoscience, vol. 6, No. 9., (2009), pp. 1979-1992 (14 pages).

Guo, Si Yue, et. al., "Fabrication of Optical Fiber Probes for Scanning Near-Field Optical Microscopy". McGill Science Undergraduate Research Journal (MSURJ) vol. 3, No. 1, Mar. 2008, pp. 32-39 (8 pages).

Jun, Y. C., et. al., "Optical Manipulation With Plasmonic Beam Shaping Antenna Structures". Advances in OptoElectronicsm, 2012 (7 pages).

Yi, J, et. al., "Coherent Beam Control With an All-Dielectric Transformation Optics Based Lens". Scientific Reports, vol. 6, No. 1, Jan. 5, 2016, pp. 1-8 (8 pages).

Grbic, Anthony, et. al., "Near-Field Plates: Subdiffraction Focusing with Patterned Surfaces". Science, vol. 320, Issue. 5875, Apr. 25, 2008, 11 pages.

Darafsheh, Arash, et al., "Systematic study of the characteristics of the photonic nanojets formed by dielectric microcylinders", Optics Communications, vol. 402, 2017, 6 pages.

Darafsheh, Arash, et al., "Photonic nanojet properties of dielectric microcylinders", Proceedings of the SPIE, vol. 10106, 101061U, 2017, 6 pages.

Nishiwaki, Seiji, "Efficient Colour Splitters for High-Pixel-Density Image Sensors". Nature Photonics, vol. 7, Mar. 2013, pp. 240-246 (7 pages).

(56) References Cited

OTHER PUBLICATIONS

Yue, Liyang, et al., "Production of photonic nanojets by using pupil-masked 3D dielectric cuboid", Journal of Physics D: Applied Physics, vol. 50, 2017, 6 pages.
Chen, W., T., et. al., "Super-Dispersive Off-Axis Meta-Lenses for Compact High Resolution Spectroscopy", CLEO: Science and Innovations 2016, San Jose, CA, Jun. 5-10, 2016, 2 pages.
Chen Y., et al., "Near field distribution of photonic nanojet formed by perfectly concentric core-shell structure" High Power Laser and Particle Beams, Sep. 2017 vol. 29 No. 9 (6 pages).
Chen Y., et al., "Near field distribution of photonic nanojet formed by perfectly concentric core-shell structure" High Power Laser and Particle Beams, Sep. 2017 vol. 29 No. 9 (11 pages).

* cited by examiner

Plane wave

Plane wave

DEVICE FOR NEAR-FIELD FOCUSING AND BEAM FORMING

The present application is a national stage application under 35 U.S.C. 371 of International Application No. PCT/EP2019/076608, entitled "DEVICE FOR NEAR-FIELD FOCUSING AND BEAM FORMING", filed on Oct. 1, 2019, which claims benefit under 35 U.S.C. § 119 (e) from European Patent Application Serial No. 18198001.2, entitled "DEVICE FOR NEAR-FIELD FOCUSING AND BEAM FORMING", filed Oct. 1, 2018.

1. TECHNICAL FIELD

The present disclosure relates generally to a device for focusing of electromagnetic waves (and among them visible light) and, more particularly, a device for near-field focusing and beam forming. This disclosure provides a new method for generating condensed optical nanojet beams with the aid of purely dielectric microstructures.

2. BACKGROUND ART

The electromagnetic wave focusing is an established way to increase locally the magnitude of the field intensity and, in such a way, to enhance efficiency of a range of devices. A common example are electro-optical sensors (image sensors) whose operational principles rely on the conversion of the energy propagating in space in the form of an electromagnetic wave into an output voltage or current. Image sensors are in the heart of almost every portable electronic device now, from smart-phones and tablets to professional light field cameras. Optical memory storage heads, optical pens and optical tips can be other examples of devices benefiting from locally controlled and enhanced field intensity. The same phenomenon of the local field enhancement is used in a variety of other application at different wavelength ranges. Optical focusing and beam forming is of a great interest for the emerging technology known as augmented reality (AR) and virtual reality (VR) glasses. Here, various types of refractive and diffractive lenses and beamforming components are used to guide the light from a micro-display or a projector towards the human eye forming a virtual image that is superimposed with an image of the physical world seen with a naked eye (in case of AR glasses) or captured by a camera (in case of VR glasses).

With the advent of nanotechnology, the ever-increasing interest to explore the optical world at nanoscale has presented the demand to manipulate visible light in the sub-wavelength scale. Researchers have made significant efforts to decrease the size of optical lenses to micron and submicron scale for this very purpose; however, due to diffraction limit, their efforts are hindered when the size of a lens approaches the wavelength of the light.

The planar lens, thanks to its small thickness and excellent focusing capability, has been developed to replace its dielectric counterpart as a paradigmatic nanophotonic component. Several types of planar lenses have been studied so far, for example zone plates, nano-slit and nano-hole arrays, photonics crystals and metasurfaces. Although different terminologies are used in the aforementioned techniques, they share the same principle of focusing, which is to generate a constructive interference at the focal point by curving the phase front of an incident plane wave. The performance of such planar lenses has been optimized through sophisticated design. Based on the above, one can conclude that:

there is a certain need for non-complicated components (simple topology with less fabrication difficulties compatible with established micro- and nano-fabrication techniques) enabling better performance characteristics (focusing functions, for example);

there is a certain need for the elements with additional possibility to manage the position of microlens focal spot.

Thus, there is a need for a new device enabling the sought light focusing and focal spot shifting functions, compatible with the planar micro- and nano-fabrication techniques.

3. SUMMARY

According to an aspect of the present disclosure, an optically-transparent device is disclosed. Such a device comprises a main part of dielectric material having a refractive index $n_2$, and is configured for forming a field intensity distribution in a near zone of the device from electromagnetic waves incidentally illuminating the device, when the device is embedded into a dielectric material having a refractive index $n_1$ lower than said refractive index $n_2$. Said device further comprises at least one insert of dielectric material having a refractive index $n_3$ higher than said refractive index $n_2$, said at least one insert being at least partly inserted into said main part, said refractive index $n_1$ being different from said refractive index $n_3$.

The device is configured such that $$W_2 \geq \frac{\lambda_2}{4}$$

with $W_2$ being a half width of said insert and $$\lambda_2 = \frac{\lambda}{n_3}, \text{ and}$$

$$W_1 \geq \frac{\lambda_1}{4}$$

with $W_1$ being a half width of said main part and $$\lambda_1 = \frac{\lambda}{n_2},$$

with $\lambda$ being the wavelength of the electromagnetic wave propagating in the dielectric material having refractive index $n_1$. In the present disclosure, a new type of optically-transparent device, such as a microlens, for generating nanojet (NJ) beams is proposed. This new type of microlens comprises a main part of dielectric material with refractive index $n_2$ and at least one dielectric insert having a refractive index $n_3$ different from the refractive index of the main part of the microlens. Thus, an inhomogeneous microstructure is obtained.

The device is configured to form a nanojet beam in a near field of the device for visible light wavelength and more generally for any optical wavelengths.

Advantageously, according to the present disclosure, two different dielectric materials are combined in such a way that all the nanojet beams originating from different edges of the microlens (edges of the main part of the microlens and edges of the insert) of the inhomogeneous microstructure recombine and contribute to the formation of a single high-intensity nanojet beam.

Such an inhomogeneous microstructure allows forming an increased field intensity distribution compared to a single material element having only a main part with refractive index $n_2$ embedded into the dielectric material having refractive index $n_1$.

The above disclosed inhomogeneous microstructure can be used for designing a new kind of near-field focusing device with improved efficiency. The characteristics of the nanojet beams formed by such an inhomogeneous microstructure are controlled by the parameters of the main part of the microlens and of the inserts (refractive index ratios between main part of the lens and insert and dielectric material with refractive index $n_1$, size/shape of the main part of the lens and position of the insert). This inhomogeneous microstructure allows enhancing the field intensity in the focal spot and control the focal spot position.

The dimensions of the device can be up to few wavelengths. An additional advantage of such an inhomogeneous microstructure is that the response of the near-field focusing device depends on the side of the device onto which the electromagnetic waves incidentally illuminate. Thus, non-symmetrical/anisotropic performance characteristics of the near-field focusing device can be obtained.

According to an embodiment of the present disclosure, when said electromagnetic waves are incident from a bottom surface of said device, and a top edge of said at least one insert is above or coincides with a top edge of said main part, a half-width $W_2$ of said at least one insert is given by:

$$W_2 = \tan\theta_{B2} \times \left(\frac{W_1}{\tan\theta_{B1}} - H_1 + H_2\right),$$

where $H_2$ corresponds to the height of said at least one insert, $H_1$ corresponds to the height of said main part, $W_1$ corresponds to the half-width of said main part, $\theta_{B2}$ is given by:

$$\theta_{B2} = \frac{90° - \sin^{-1}\left(\frac{n_2}{n_3}\right)}{2},$$

and $\theta_{B1}$ is given by:

$$\theta_{B1} = \frac{90° - \sin^{-1}\left(\frac{n_1}{n_2}\right)}{2}.$$

According to another embodiment of the present disclosure, when said electromagnetic waves are incident from a top surface of said device, and a top edge of said at least one insert is above or coincides with a top edge of said main part, a half-width $W_2$ of said at least one insert is given by:

$$W_2 = \tan\theta_{B2} \times \left(\frac{W_1}{\tan\theta_{B1}}\right),$$

where $W_1$ corresponds to the half-width of said main part, $\theta_{B2}$ is given by:

$$\theta_{B2} = \frac{90° - \sin^{-1}\left(\frac{n_2}{n_3}\right)}{2},$$

and $\theta_{B1}$ is given by:

$$\theta_{B1} = \frac{90° - \sin^{-1}\left(\frac{n_1}{n_2}\right)}{2}.$$

According to the embodiments disclosed above, focal lengths of the main part of the microlens and of the insert are adjusted so that $F_L = F_{inc}$ wherein $F_L$ and $F_{inc}$ respectively correspond to the focal length of the main part and to the focal length of the insert. The response of the system depends on to the side of electromagnetic waves incidence on the device. Using the above given formulas to design the insert, maximal intensity in the nanojet hot spot can be achieved.

According to another embodiment of the present disclosure, a shape of said main part and a shape of said at least one insert belong to a list comprising: a cuboid, a cylinder, a cone, a prism.

According to another embodiment of the present disclosure, said main part and said at least one insert may have vertical edges or non-vertical edges, for example in this case the main part and the insert have prismatic shapes. By vertical edges, it is meant here edges parallel to a z-axis of the xyz plane. This covers shapes having edges in the plane xy forming a base angle of 90° with the xy plane. By non-vertical edges, it is meant here that the shape of the main part and the insert has a base angle different from 90° with the xy plane.

According to another embodiment of the present disclosure, the top edge of said at least one insert coincides with the top edge of said main part and the height of said at least one insert equals the height of said main part. In that case, the response of the device does not depend on the side of plane wave incidence, that is the device has isotropic properties. This embodiment corresponds to the case where the insert is fully inserted into the main part and top edges and bottom edges of the main part and the insert respectively correspond.

According to another embodiment of the present disclosure, the top edge of said at least one insert is above the top edge of said main part and the bottom edge of said at least one insert is below the top edge of said main part, or the top edge of said at least one insert coincides with the top edge of said main part and the height of said at least one insert is smaller that the height of said main part.

In these variants, the device's response is anisotropic, that is the device's response depends on the side of plane wave incidence.

In the variant wherein the top edge of said at least one insert is above the top edge of said main part and the bottom edge of said at least one insert is below the top edge of said main part, the insert is partially inserted in the main part, as a top part of the insert is above the main part.

In the variant wherein the top edge of said at least one insert coincides with the top edge of said main part and the height of said at least one insert is smaller that the height of said main part, the insert is fully inserted in the main part.

According to another embodiment of the present disclosure, said main part and said at least one insert share at least one same axis of symmetry.

According to another embodiment of the present disclosure, an axis of symmetry perpendicular to a top surface of said at least one insert is shifted from an axis of symmetry perpendicular to a top surface of said main part.

According to this embodiment, the insert is shifted with regards to the axis of symmetry of the main part of the microlens. In this way, nanojet beam shift is obtained. Such a shift can also be expressed as the shift of one of the lateral edge of the insert, for instance the left edge, with regards to the axis of symmetry of the main part of the microlens along the lateral direction.

According to another embodiment of the present disclosure, said dielectric material of said main part or of said at least one insert belongs to the group comprising:
- glass;
- plastic;
- a polymer material;

According to another aspect of the present disclosure, a system is disclosed which comprises a dielectric host medium with refractive index $n_1$ and at least one optically-transparent device according to any one of the embodiments cited above embedded into said dielectric host medium.

According to another aspect of the present disclosure, a system is disclosed which comprises a dielectric substrate with refractive index $n_4$ acting as a support layer and at least one optically-transparent device according to any one of the embodiments cited above placed on said dielectric substrate. According to this embodiment, the refractive index of the substrate will not affect the angle of the nanojet generation.

According to another aspect of the present disclosure, an optical sensor device comprising at least one optically-transparent device according to any one of the embodiments cited above or a system according to any one of the embodiments cited above is disclosed.

4. BRIEF DESCRIPTION OF THE DRAWINGS

Figure 2:
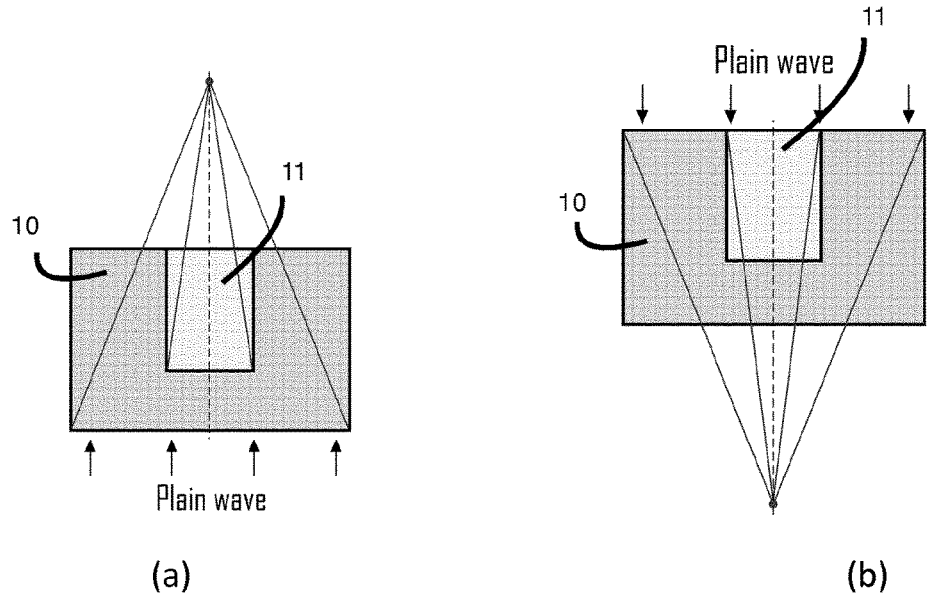
Figure 3:
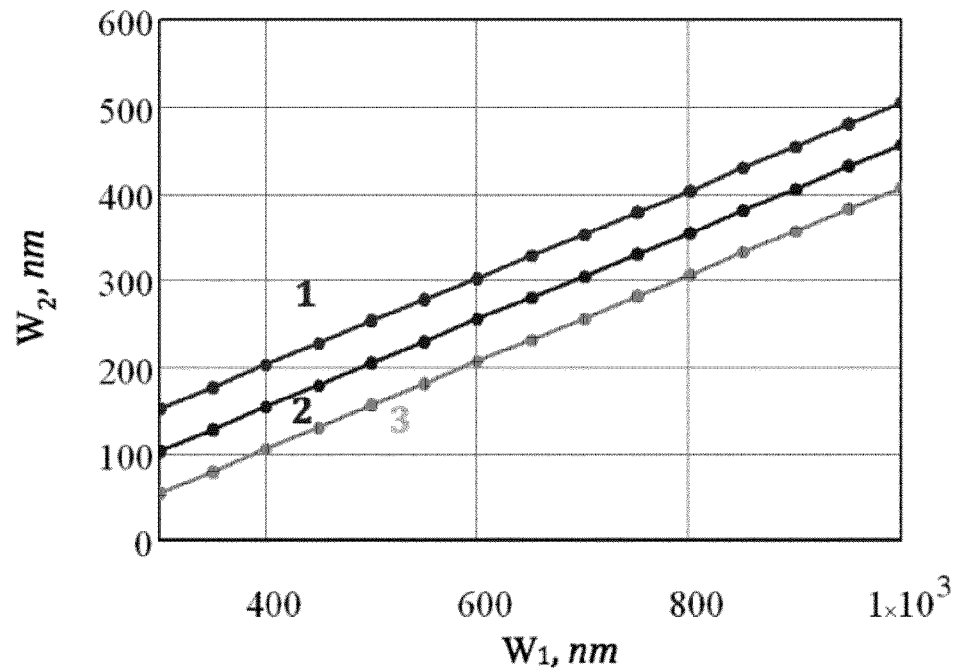
Figure 4:
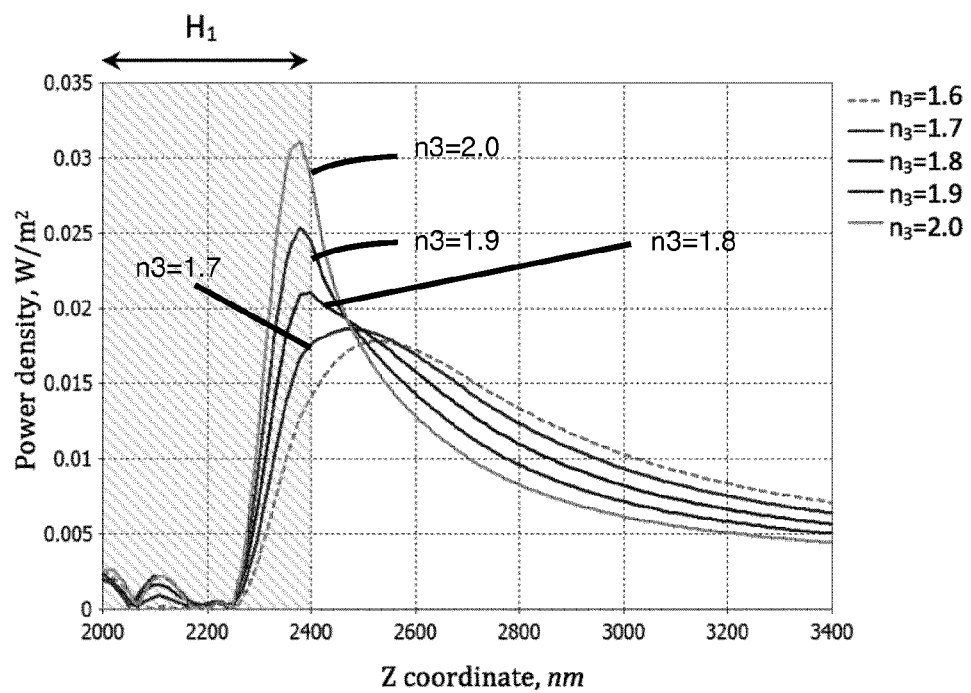
Figure 5:
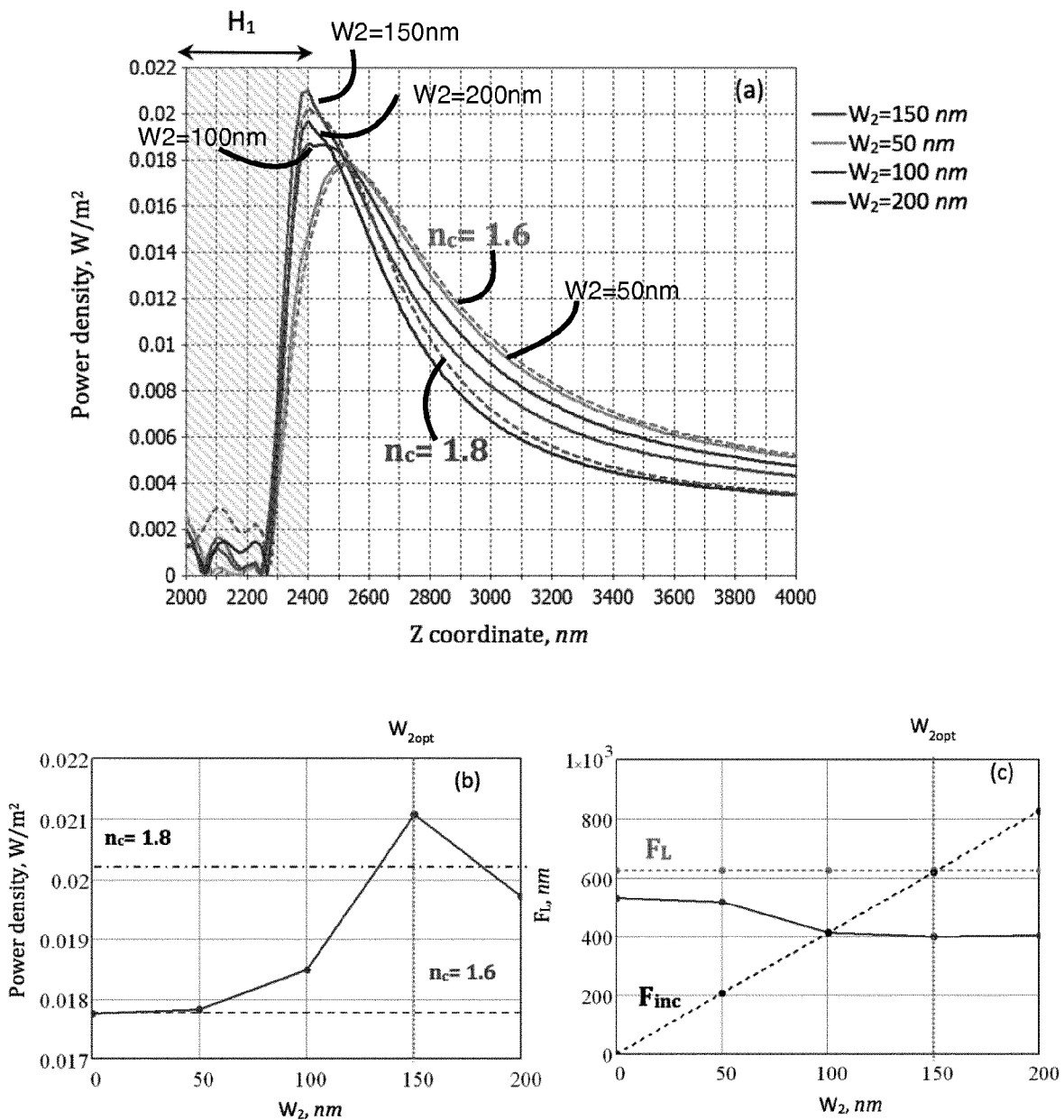
Figure 6:
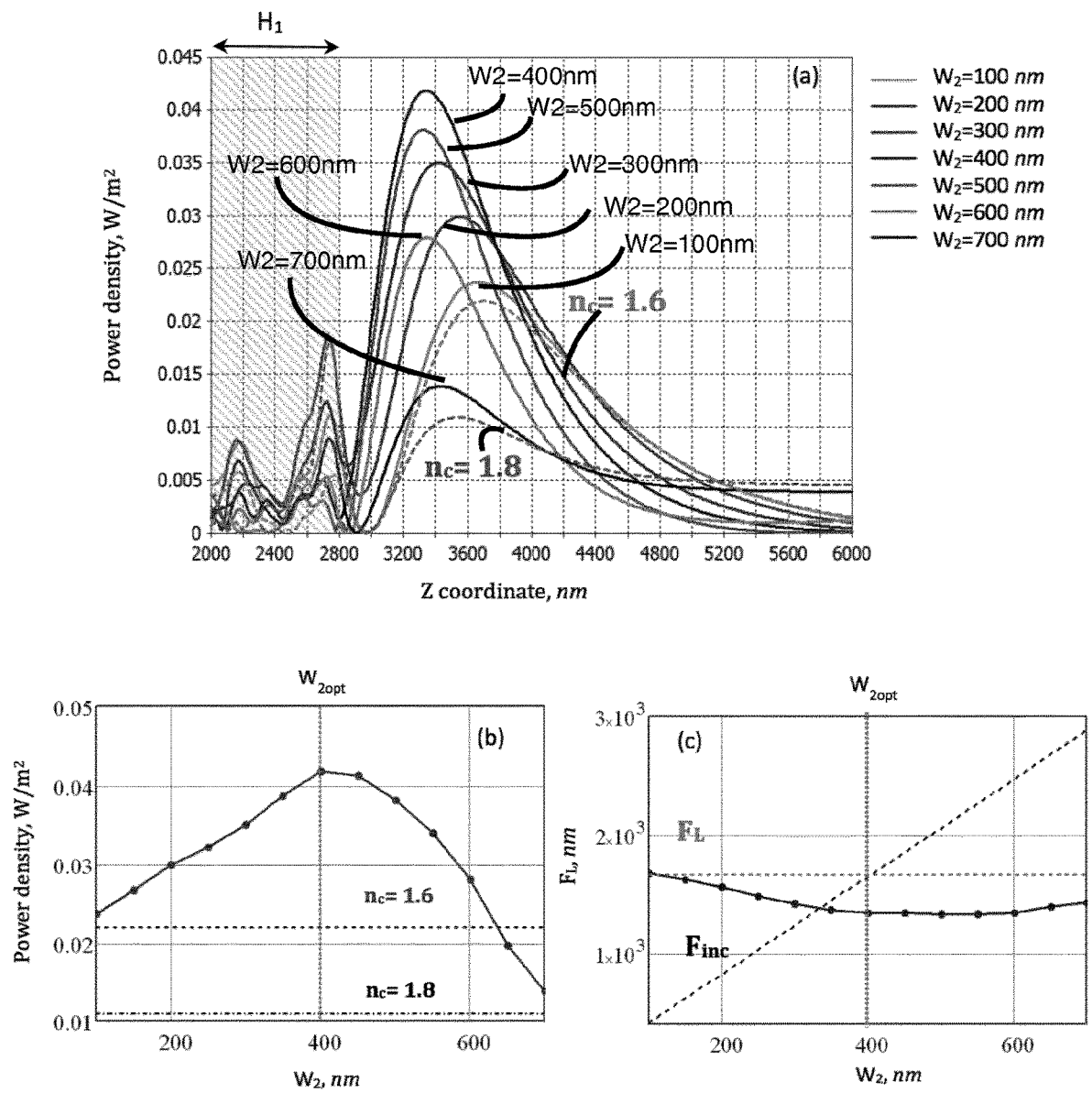
Figure 7:
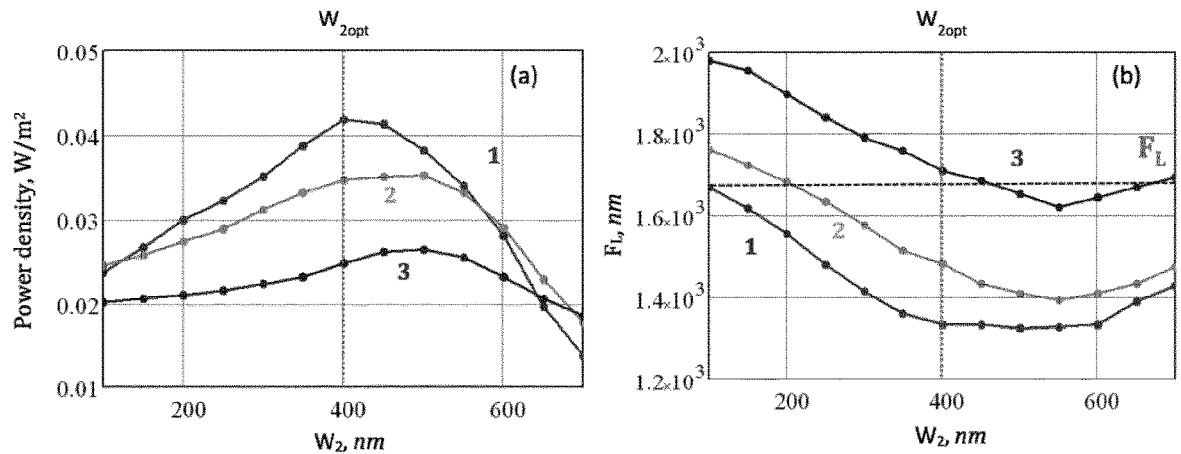
Figure 8:
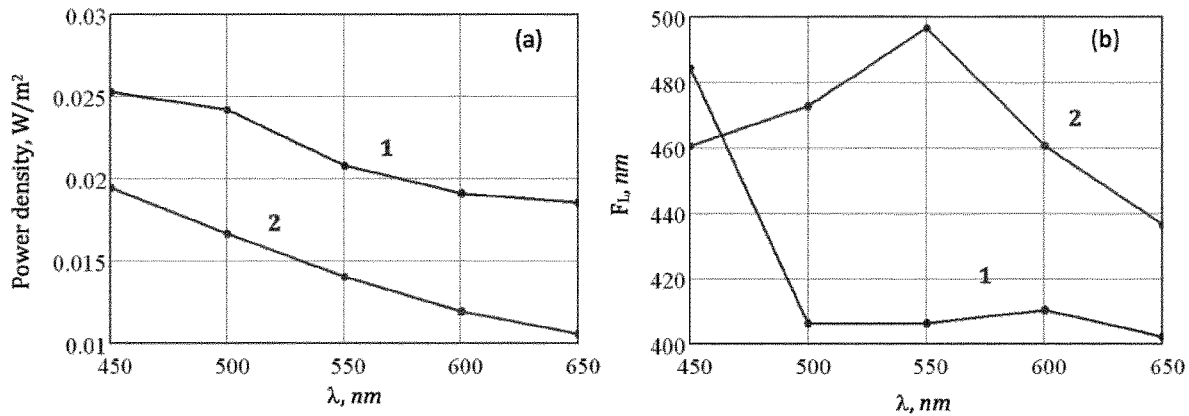
Figure 9:
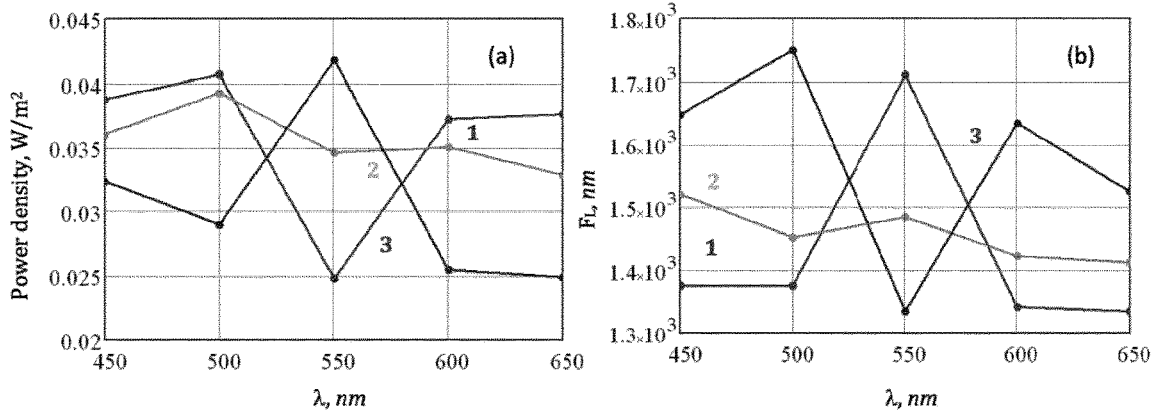
Figure 10:
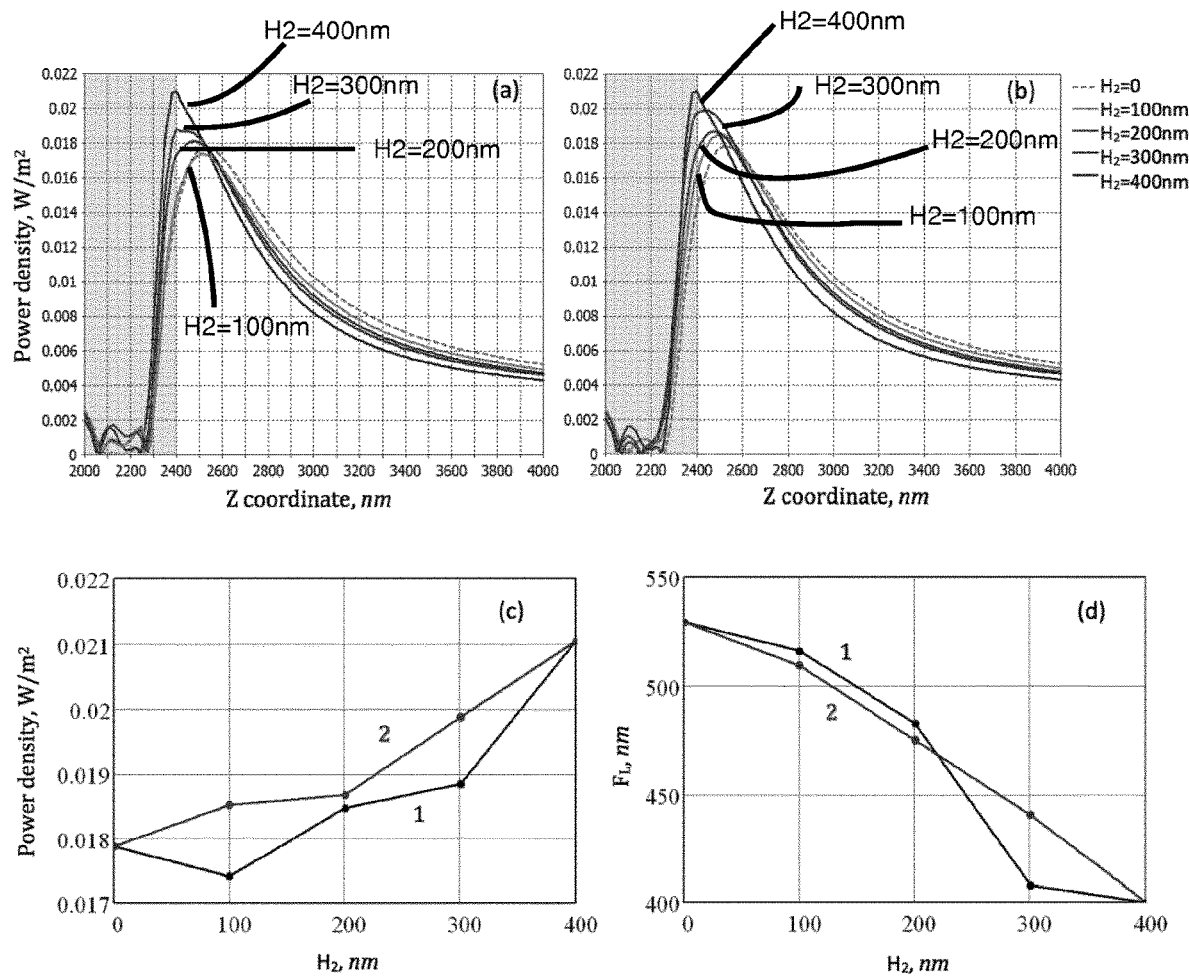
Figure 11:
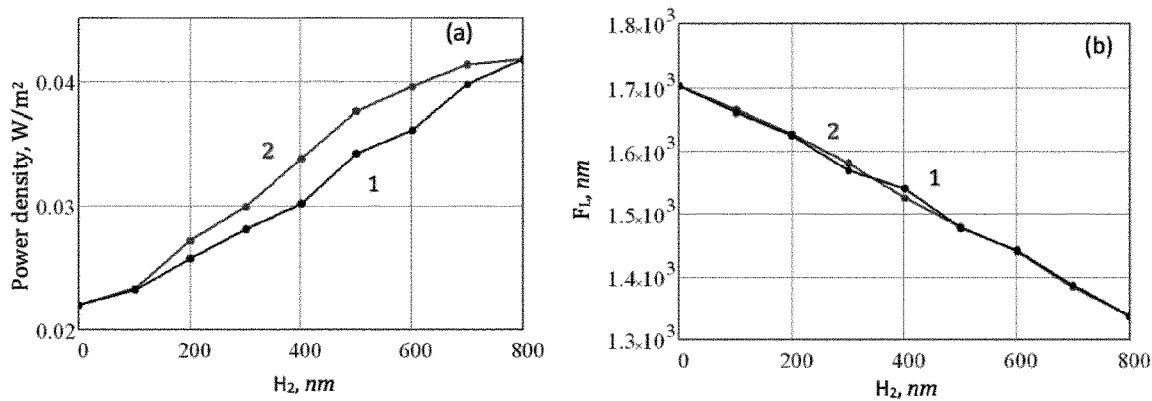
Figure 12:
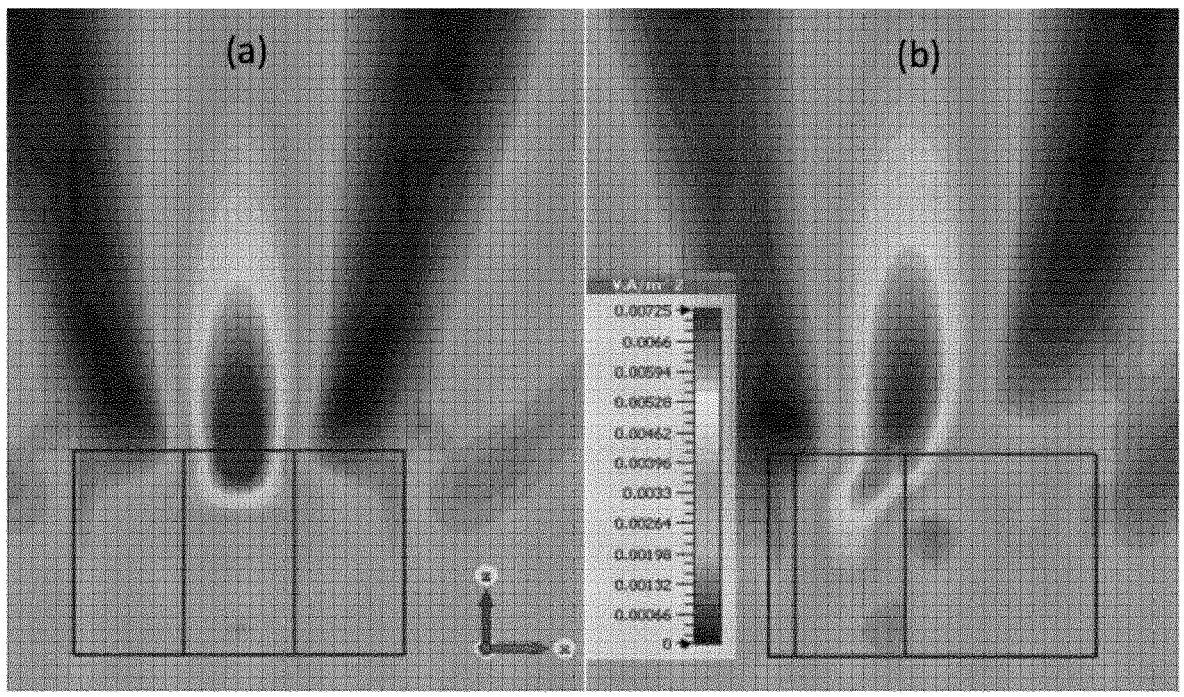
Figure 12:
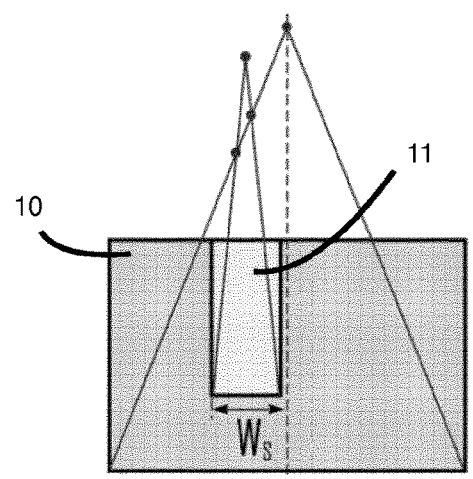
Figure 13:
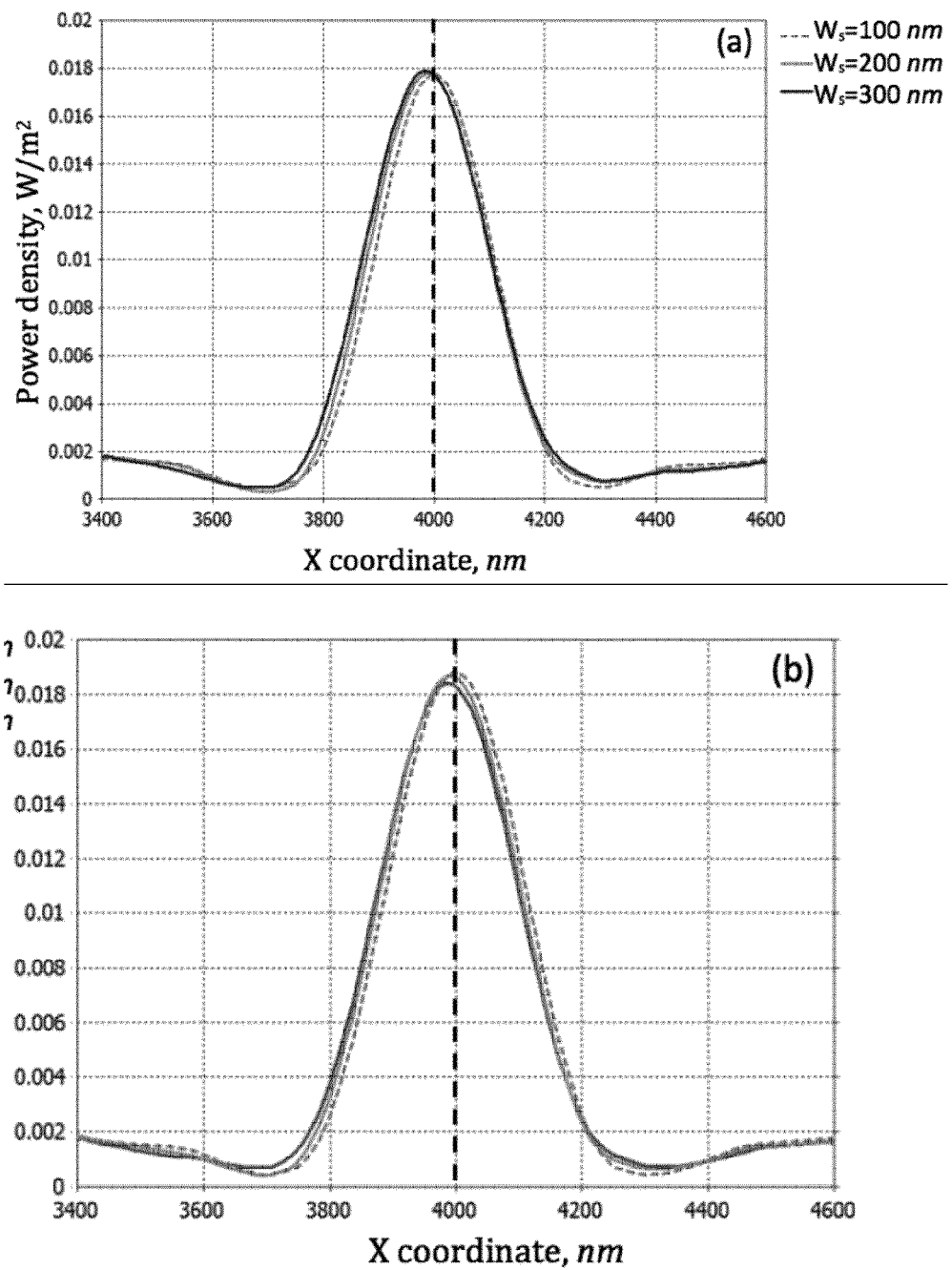
Figure 14:
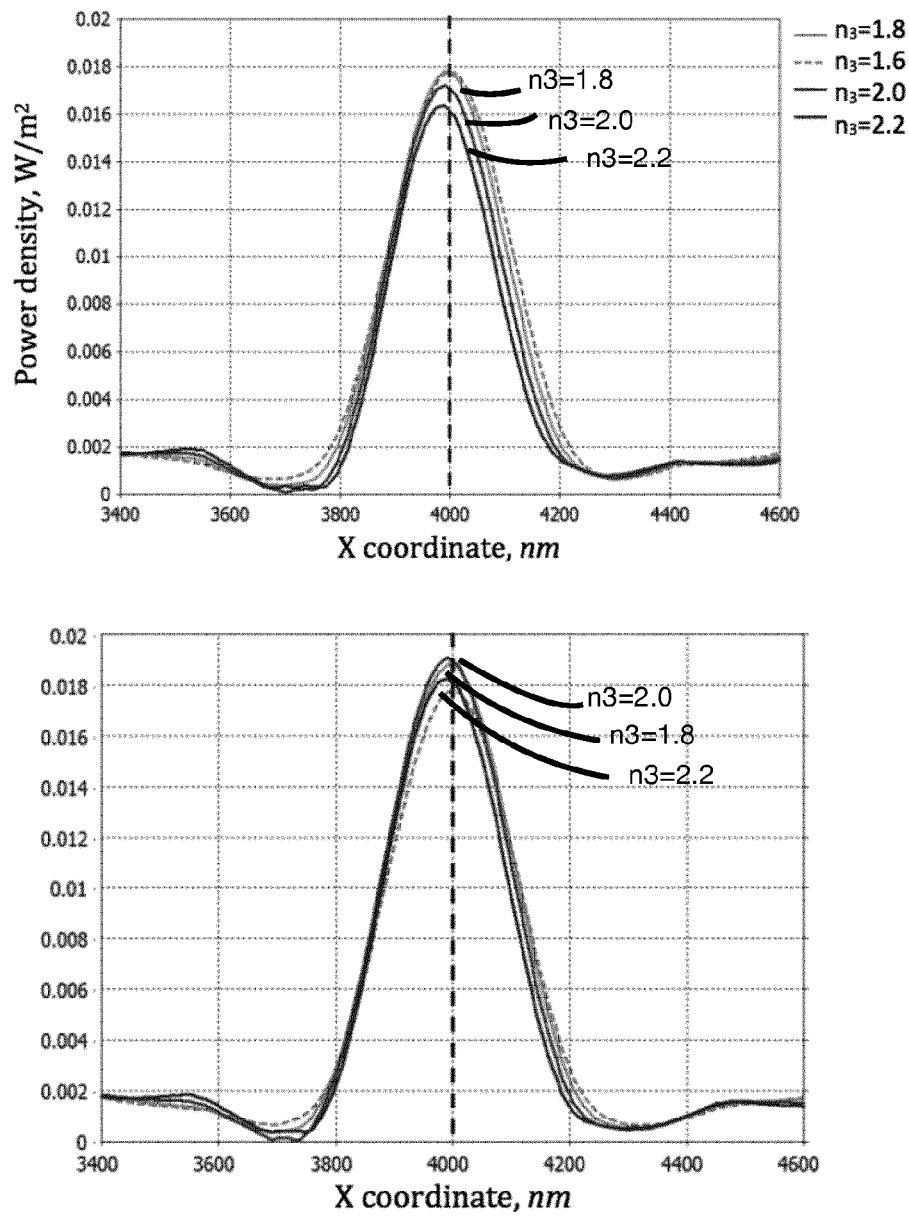
Figure 15:
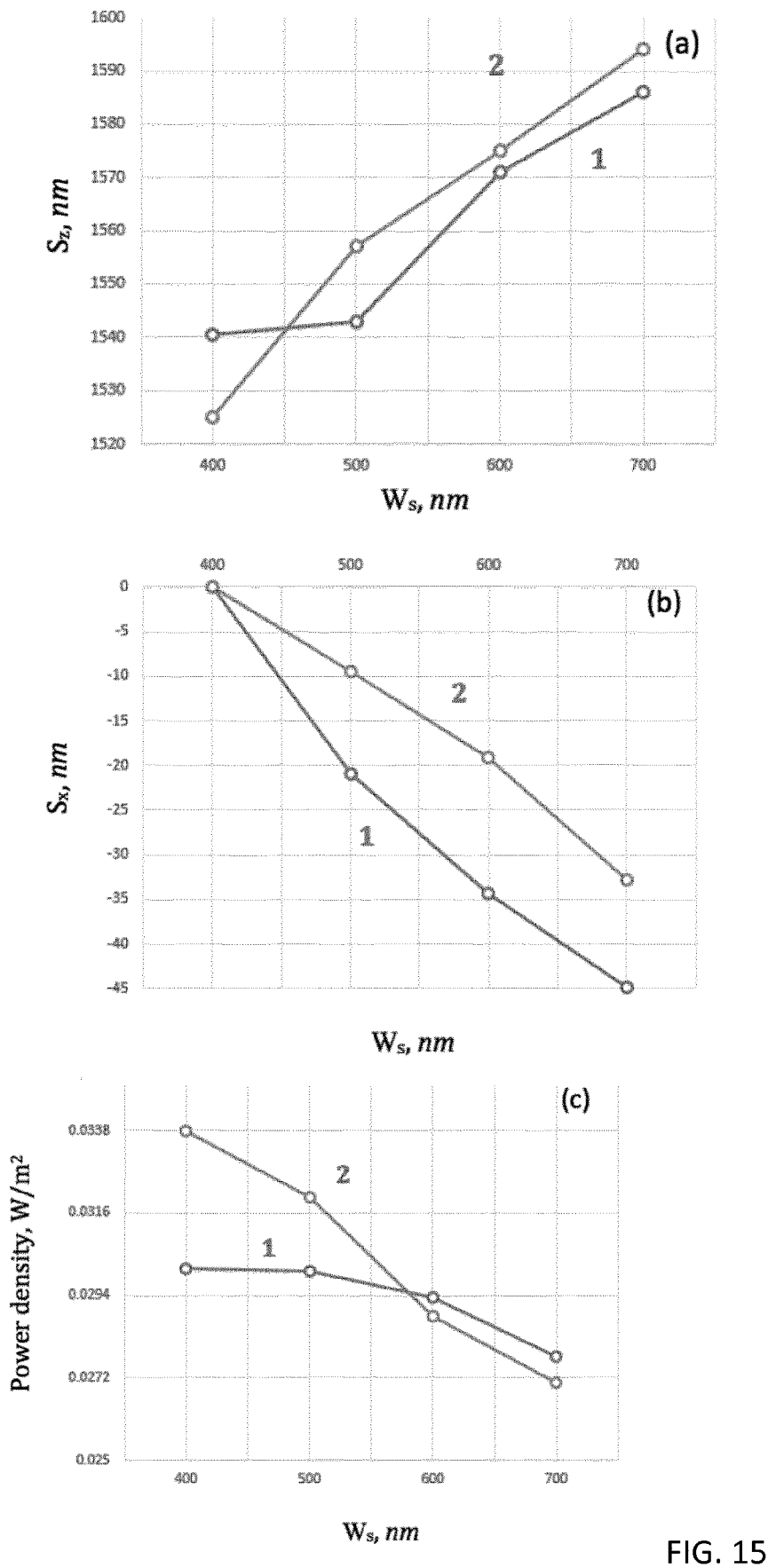
Figure 16:
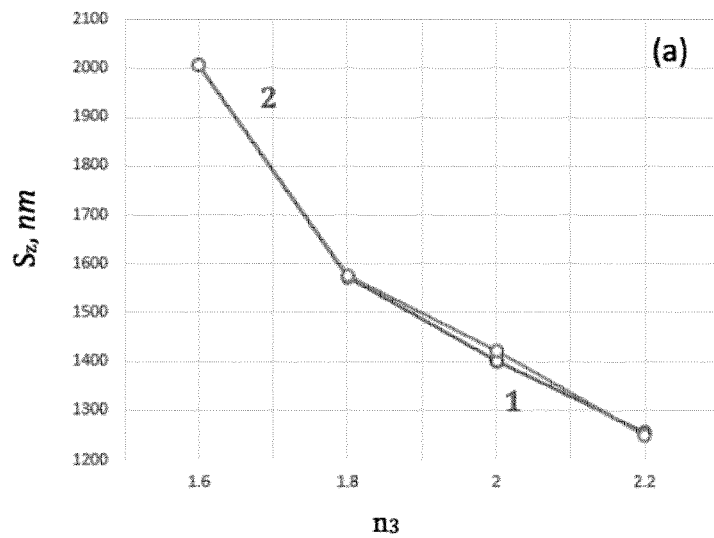
Figure 16:
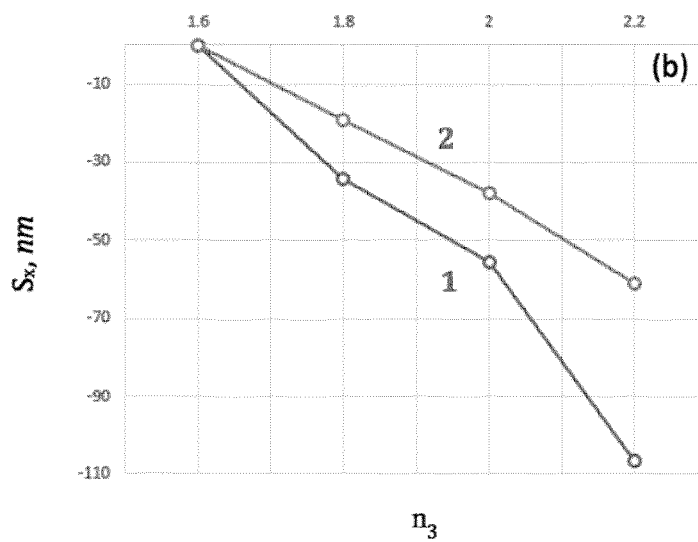
Figure 16:
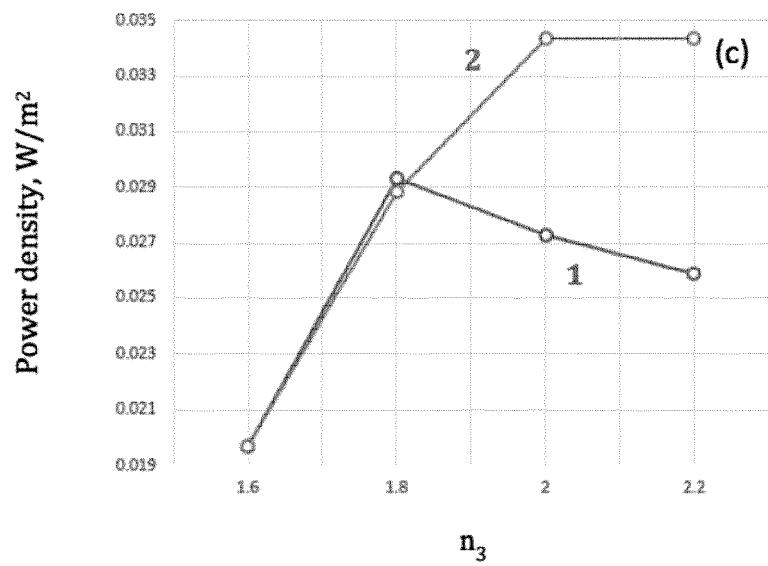
Figure 17:
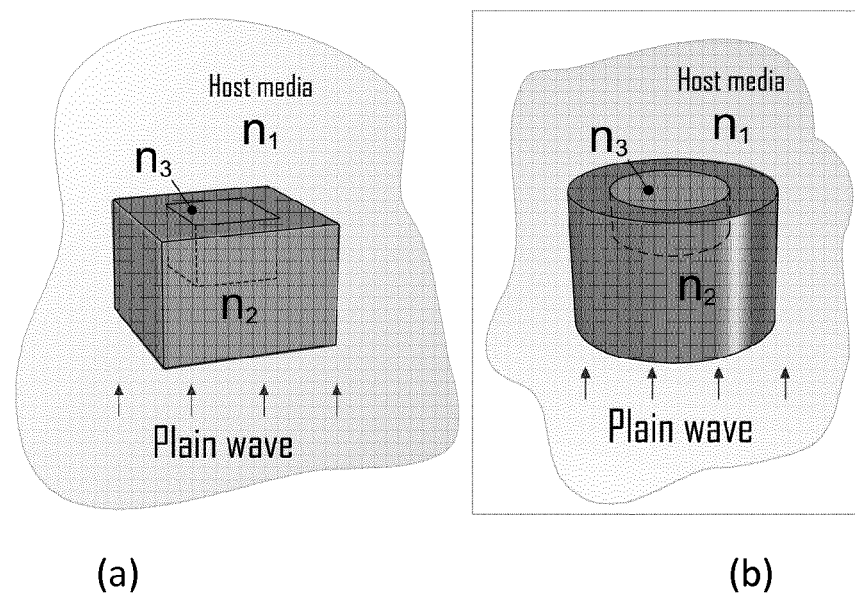
Figure 18:
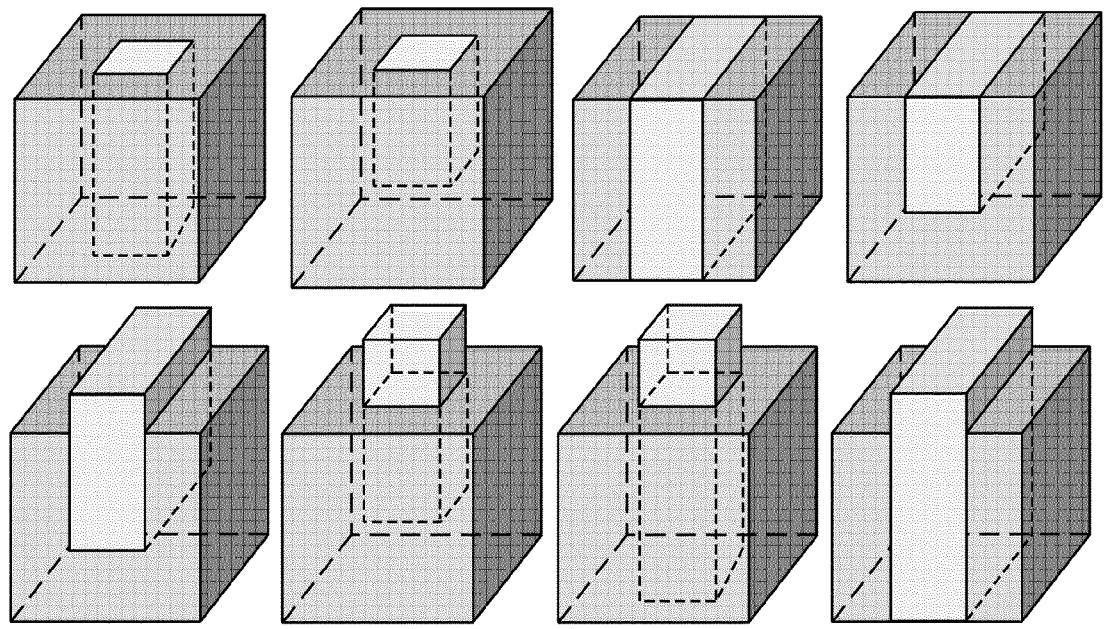
Figure 19:
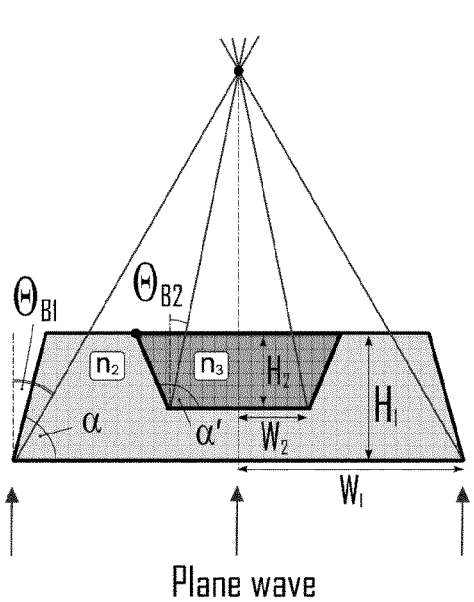
Figure 20:
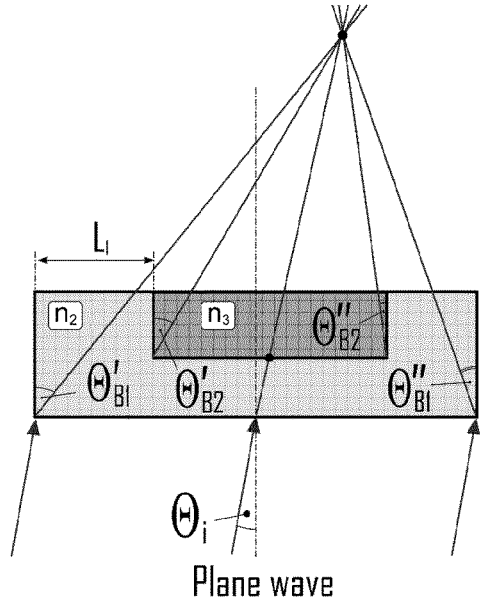
Figure 21:
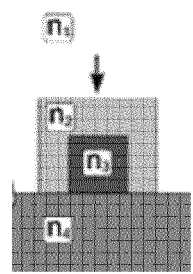

The present disclosure can be better understood with reference to the following description and drawings, given by way of example and not limiting the scope of protection, and in which:

FIG. 1(a) illustrates an exemplary topology of an inhomogeneous nanojet lens with an insert according to an embodiment of the present disclosure, FIG. 1(b) illustrates a cross-section view of the exemplary topology illustrated in FIG. 1(a), FIGS. 2(a) and (b) illustrates cross-section views of an inhomogeneous microlens with adjusted focuses of the different parts constituting the microlens for plane wave incidence from the bottom of the microlens (a) and for plane wave incidence from the top of the microlens (b), FIG. 3 illustrates the dependence of an optimal width of the insert ($W_2$) on the width of the main part of microlens ($W_1$) for electromagnetic wave incidence from the bottom, for a system according to an embodiment of the present disclosure, FIG. 4 illustrates power density distribution along z-axis for selected values of $n_3$ for an exemplary inhomogeneous nanojet lens with $n_1=1$, $n_2=1.6$, $W_1=L_1=300$ nm, $W_2=L_2=150$ nm, $H_1=H_2=400$ nm, the nanojet lens being is illuminated by a plane wave at $\lambda=550$ nm, FIG. 5 illustrates power density distribution along z-axis for selected values of $W_2=L_2$ (a), power density of nanojet lens hot spot and position of nanojet hot spot (c) as a function of an insert of width $W_2$, for an exemplary system according to an embodiment of the present disclosure, FIG. 6 illustrates power density distribution along z-axis for selected values of $W_2=L_2$ (a), power density of nanojet lens hot spot (b) and position of nanojet hot spot (c) as a function of an insert of width $W_2$, for an exemplary system according to another embodiment of the present disclosure, FIG. 7 illustrates power density of nanojet lens hot spot (a) and position of nanojet hot spot (b) as a function of an insert of width $W_2$, for different embodiments of an exemplary system according to the present disclosure, FIG. 8 illustrates power density of nanojet lens hot spot (a) and position of nanojet hot spot (b) as a function of the wavelength, for different embodiments of an exemplary system according to the present disclosure, FIG. 9 illustrates power density of nanojet lens hot spot (a) and position of nanojet hot spot (b) as a function of the wavelength, for other different embodiments of an exemplary system according to the present disclosure, FIG. 10 illustrates power density distribution along z-axis for selected values of the height $H_2$ for an inhomogeneous microlens with the insert for a plane wave incidence from the bottom of microlens (a) and for a plane wave incidence from the top of microlens (b); power density of nanojet hot spot (c), and position of nanojet hot spot (d) as a function of the height $H_2$, for an exemplary system according to an embodiment of the present disclosure, FIG. 11 illustrates power density of nanojet hot spot (a), position of nanojet hot spot (b) as a function of the height $H_2$, for an exemplary system according to another embodiment of the present disclosure, FIG. 12 illustrates nanojet beams produced by an exemplary inhomogeneous microlens with $n_1=1$, $n_2=1.6$, $n_3=1.8$, $W_1=L_1=300$ nm, $H_1=H_2=400$ nm, $W_2=L_2=100$ nm according to an embodiment of the present disclosure for (a)—$W_s=W_2=100$ nm and according to another embodiment of the present disclosure for (b)—$W_s=250$ nm, and (c) illustrates cross-section view of an inhomogeneous microlens with nonsymmetrical insert according to an embodiment of the present disclosure, FIG. 13 illustrates power density distribution along x-axis at $Z_0=510$ nm for selected values of the insert position ($W_s$) for an inhomogeneous microlens an the insert for a plane wave incidence from the top of microlens (a) and for a plane wave incidence from the bottom of microlens (b), for a system according to an embodiment of the present disclosure, FIG. 14 illustrates power density distribution along x-axis at $Z_0=510$ nm for selected values of the refractive index $n_3$ for an inhomogeneous microlens with an insert for a plane wave incidence from the top of microlens (a) and for a plane wave incidence from the bottom of microlens (b), for a system according to an embodiment of the present disclosure, FIG. 15 illustrates (a) Z-coordinate of nanojet hot spot, (b) X-coordinate of nanojet hot spot, (c) power density in nanojet hot spot as a function of insert position $W_s$, for an exemplary system according to an embodiment of the present disclosure, FIG. 16 illustrates (a) Z-coordinate of nanojet hot spot, (b) X-coordinate of nanojet hot spot and (c) power density in nanojet hot spot as a function of refractive index on an insert, for an exemplary system according to an embodiment of the present disclosure, FIG. 17 illustrates schematic views of a cuboid inhomogeneous nanojet microlens (a) and a cylinder inhomogeneous nanojet microlens (b), with the bottom plane wave incidence, according to embodiments of the present disclosure, FIG. 18 illustrates schematic views of different embodiments of the microlenses for different form of the inserts according to the present disclosure, FIG. 19 illustrates a cross-section view of an exemplary topology of the inhomogeneous microlens according to another embodiment of the present disclosure, FIG. 20 illustrates a cross-section view of an exemplary topology of the inhomogeneous microlens according to another embodiment of the present disclosure and an oblique plain wave incidence, FIG. 21 illustrates a cross-section view of an exemplary topology of the inhomogeneous microlens according to another embodiment of the present disclosure wherein the inhomogeneous microlens is placed on a layer substrate.

5. DESCRIPTION OF EMBODIMENTS

There are a number of near-field focusing components enabling the sub-wavelength resolution (that is of interest for many today and future nano-photonic applications). A photonic nanojet is a narrow high-intensity optical radiation flux formed in the proximity to the shadow surface of illuminated transparent dielectric symmetric bodies with a diameter comparable or somewhat larger than the wavelength of the incident optical radiation. The physical origin of photonic nanojet formation arises from the interference (both constructive and destructive) of the radiation net fluxes diffracted and passed through a particle (S. -C. Kong, A. Sahakian, A. Taflove, and V. Backman, "*Photonic nanojet-enabled optical data storage,*" Opt. Express, Vol. 16, No. 18, 2008, Chen et al. "*Optical metrology using a photonic nanojet,*" U.S. Pat. No. 7,394,535 B1, 2008, V. Pacheco-Pena, M. Beruete, I V. Minin, and O. V. Minin, "*Terajets produced by dielectric cuboids,*" Applied Phys. Lett. Vol. 105, 084102, 2014, V. Pacheco-Pena, M. Beruete, I. V. Minin, and O. V. Minin, "*Multifrequency focusing and wide angular scanning of terajets,*" Opt. Lett., vol. 40, no. 2, pp. 245-248, 2015).

A most striking and specific feature of photonic nanojet is the extremely high spatial localization of the light field in the transverse direction (relative to the direction of incidence), which, in contrast to the conventional focusing optics, can lead to the subwavelength dimensions of the photonic jet. The common interest to the nanojet effect is mostly caused by the promises of its practical application in nanophotonics, biology, medicine, and nanoelectronics. The principles of functioning of some devices are based on the fact that the nanojet can provide the high intensity of the electromagnetic field in a localized spatial region near a microparticle and has high sensitivity to the perturbations of both the field and material origin. The problems of controlled nanojet characteristics' manipulation, the creation of thinner or longer and intensive jets by variation of microlens optical properties attract the growing interest. The latest studies have shown that both the nanojet shape and intensity depend significantly on the size and optical properties of a generating microparticle (A. V. Itagi and W. A. Challener, "*Optics of photonic nanojets,*" J. Opt. Soc. Am. A, Vo.22, 2847 (2005), A. Heifetz, J. J. Simpson, S. -C. Kong, A. Taflove, and V. Backman, "*Subdiffraction optical resolution of a gold nanosphere located within the nanojet of a Mie-resonant dielectric microsphere,*" Opt. Express, Vol. 15, 17334 (2007), A. Devilez, N. Bonod, B. Stout, D. Gerard, J. Wenger, H. Rigneault, and E. Popov, "*Three-dimensional subwavelength confinement of light with dielectric microspheres,*" Opt. Express, Vol. 17, 2089 (2009)).

Moreover, if the nanojet is produced by a composite radially inhomogeneous particle consisting of several concentric shells with different refractive indices (Yu. Shen, L. V. Wang, J. -T. Shen, "*Ultralong photonic nanojet formed by a two-layer dielectric microsphere,*" Opt.Lett., Vol. 39, No. 14, 4120 (2014), C. M. Ruiz, J. J. Simpson, "*Detection of embedded ultrasubwavelength-thin dielectric features using elongated photonic nanojets,*" Opt.Expr., Vol. 18, No. 16, 16805 (2010), Yu. E. Geints, A. A. Zemlyanov, and E. K. Panina, "*Photonic nanojet calculations in layered radially inhomogeneous micrometer-sized spherical particles,*" J. Opt. Soc. Am. B, Vol. 28, No. 8, 1825 (2011), G. Gu, R. Zhou, Z. Chen, H. Xu, G. Cai, Z. Cai, M. Hong, "*Super-long photonic nanojet generated from liquid-filled hollow microcylinder,*" Opt. Lett., Vol. 40, No. 4, 625 (2015)) or graded refractive index material (X. Mao, Ya. Yang, H. Dai, D. Luo, B. Yao, S. Yan, "*Tunable photonic nanojet formed by generalized Luneburg lens,*" Opt. Expr., Vol. 23, No. 20, 026426 (2015)), then the nanojet characteristics can be changed significantly, in particular, it becomes possible to elongate the photonic jet abnormally.

According to an aspect of the present disclosure, a new technical solution for the design of near-field focusing device with improved efficiency (i.e. field intensity enhancement in the focal spot) and controlled focal spot position, is introduced. An additional advantage of the proposed topology is in the nonsymmetrical/anisotropic (i.e. depending on the side of electromagnetic wave incidence) performance characteristics of the focusing element.

A new type of nanojet microlens with dielectric inserts is proposed. The presented solution is based on the difference between the refractive indexes of the material of the microlens and of the insert. It is proposed to combine 2 different dielectric materials in such a way that all the nanojet beams, originating from different edges (edges of the main element and edges of the insert) of the inhomogeneous microstructure, recombine and contribute to the formation of a single high-intensity nanojet beam.

As schematically shown in FIG. 1, a desired effect can be achieved for a system with an insert, combining two or more elements with different refractive indexes. The characteristics of the nanojet beams are controlled by the parameters of the constitutive parts (i.e. refractive index ratios between the main part of the lens, insert and host medium surrounding the microlens, size/shape of the constitutive parts and position of the insert). Moreover, the nonsymmetrical geometry of the system leads to the dependence of the response of the proposed elements on the side of electromagnetic wave incidence.

Performances of the proposed inhomogeneous microlens with insert are evaluated numerically via full-wave electromagnetic analysis of an inhomogeneous microlens in a form of a cuboid, whose cross-section is represented in FIG. 1*b*. For simplicity, it is assumed that all the materials are lossless and non-dispersive. The inventors have found that diffraction of a plane wave on the inhomogeneous microlens, with the inserts having a higher refractive index than that of the host medium ($n_3 > n_2 > n_1$), can result in the formation of more intensive condensed optical beams (so-called nanojets). The intensity, dimensions and shape of the beam can be controlled by the variation of the insert size, shape (e.g. base angle) material. Also, by changing the geometry and material parameters of constitutive parts (including relative positioning of the main part of the lens and the insert), the position of nanojet hot spot can be controlled.

The improved performance characteristics of the proposed inhomogeneous nanojet microlenses make them attractive for a variety of today and future mobile applications, including eyewear displays (e.g. AR and VR glasses), image sensors (e.g. for photo/video/light field cameras), advanced optical communication & exploration systems, memory storage. The proposed inhomogeneous nanojet microlenses corresponds to the 'mobile technology' pillar, however, it may find application in other domains and in a wider wavelength range, including microwave, mm-wave, sub-mm-wave, IR, and optical ranges.

FIG. 1(a) illustrates a general topology of an inhomogeneous nanojet microlens (100) comprising a main part (10) of dielectric material and an insert (11) of dielectric material at least partly inserted in the main part (10) of the microlens (100). Such an inhomogeneous nanojet microlens (100) is an optically transparent device.

In the example illustrated in FIG. 1, the main part of the microlens and the insert are cuboids, the top surface of the insert coincides with the top surface of the microlens, and the microlens and the insert shares a same axis of symmetry parallel to a z-axis.

Dimensions of the microlens and insert are as follows:
$H_1$, $H_2$ being respectively the height of the microlens and of the insert along the z-axis,
$W_1$ $W_2$ being respectively the half-width of the microlens and of the insert along the x-axis,
$L_1$, $L_2$ being respectively the half-length of the microlens and of the insert along the y-axis.

FIG. 1(b) illustrates cross-section views of the inhomogeneous microlens with the insert.

Other shapes for microlens and insert are also possible, the cross-section views in FIG. 1b may correspond to a rib, cuboid, or cylinder embedded in a homogeneous dielectric host media with a refractive index $n_1$ with $n_1 < n_2$. It is assumed that the microlens has a dielectric insert (11) with a refractive index $n_3$ with $n_3 > n_2$. The material and size of the insert with refractive index $n_3$ can be selected arbitrary and optimized depending on the parameters of main part in order to reach a maximum field intensity enhancement for the beam generated in the near zone as a result of recombination of the nanojet beams associated with the edges of microlens constitutive parts. The total response of such system depends on the side of plane wave illumination, as is illustrated in FIG. 2 described further below.

The effect of the size, position and refractive index of the insert for such type of microlens on the intensity and length of the generated nanojet is investigated.

For the proposed topology, the position of the top edge of insert is fixed to coincide with the position of the top edge of the main part of the microlens. But, the height of the insert can be different and the top edge of the insert can be higher than the top edge of the main part, as will be illustrated further below. For simplification, only the cases when the top edges of constitutive parts coincide and height of the insert is equal or less than the total height of the microlens are numerically investigated here.

Hereafter, it is assumed that the structures have vertical edges parallel to z-axis and top/bottom surface parallel to xy-plane, which corresponds to the base angle α=90 degree. However, some prismatic structures (with arbitrary base angles) can also be used. Variation of the base angle value provides additional degree of freedom in the control of the nanojet beam radiation direction.

In an approximation, the focal length of the nanojet lens with the insert can be determined as the function of the size (width or radius) and index ratio of the media inside and outside the microstructure. Let us present a set of equations to estimate the optimal dimensions of the constitutive parts for maximal enhancement of the field intensity of generated nanojet in a case of a system with $n_3 > n_2 > n_1$.

We demonstrate that the beam intensity and hot spot position are sensitive to the sizes and values of refractive index of an insert. This effect is explained by the interference of the nanojet beams, associated with the bottom edge of the main part of microlens, and the nanojet beam, associated with the bottom edge of the insert (for a case of electromagnetic wave incidence from the bottom of the microlens). In this case, the two beams make an input into the total generated beam. The total response of the inhomogeneous systems with dimensions larger than a few wavelengths of an incident wave represents the interplay between the nanojet and the Fresnel diffraction phenomenon.

The beam-forming phenomenon is associated solely with the edge of the system and the nanojet beam radiation angle is defined by the Snell's low (A. Boriskin and L. Blondé, "Device for forming a field intensity pattern in the near zone, from incident electromagnetic waves", EP3223063).

So, the nanojet beam radiation angle for constitutive parts of microlens can be determined as a function of the ratio between the refractive indexes of the host media and material of the main part of the lens (for the insert it is assumed that the host medium is the material of the main part of microlens), and the base angle of the element. In the embodiment disclosed here, we analyze the elements with vertical edges, that is the base angle of the main part is equal to 90°, as well as the base angle of the insert. The base angle of a component is defined as the angle between its side edge and the x-axis. Here, it is assumed that the side edge is vertical and is parallel to the z-axis, as illustrated in FIG. 1(a).

In the following, we consider that the incident electromagnetic plane wave is a plane wave that is normal to the bottom/top plane edge of the microlens. Other embodiments can include an oblique plane wave incidence. The incident electromagnetic wave has a wavelength which is comprised in the range 390 to 700 nm.

For the main part of the microlens with refractive index $n_2$ the nanojet beam radiation angle $\Theta_{B1}$ (as shown in FIG. 1(b)) can be determined using the approximate formula:

$$\Theta_{B1} \approx \frac{90° - \Theta_{TIR1}}{2}, \quad (1)$$

where $$\Theta_{TIR1} = \sin^{-1}\left(\frac{n_1}{n_2}\right)$$

is the critical angle of refraction.

The focal length of the lens can be estimated as:

$$F_L = W_1 \gamma_1, \quad (2)$$

where $$\gamma_1 = \frac{1}{\tan\Theta_{B1}},$$

$W_1$ is the half-width (radius) of the main part of microlens (FIG. 1).

To increase the intensity in the nanojet hot spot, the focal lengths of the constitutive elements should be adjusted so that $$F_L = F_{inc}. \tag{3}$$

with $F_L$ being the focal length of the main part (10) of the microlens and $F_{inc}$ being the focal length of the insert (11). FIG. 2 illustrates cross-section views of an inhomogeneous microlens with the adjusted focuses of constitutive parts for a plane wave incidence from the bottom (FIG. 2(a)) and for a plane wave incidence from the top of microlens (FIG. 2(b)).

Here $F_{inc} = W_2 \gamma_2$ is the focal length of the insert, $W_2$ is the half-width (radius) of the insert (FIG. 1), $$\gamma_2 = \frac{1}{\tan\Theta_{B2}}, \Theta_{B2} \approx \frac{90° - \Theta_{TIR2}}{2}, \Theta_{TIR2} = \sin^{-1}\left(\frac{n_2}{n_3}\right),$$

with $\Theta_{B2}$ the nanojet beam radiation angle for the insert (as shown in FIG. 1(b)), and $\Theta_{TIR2}$ the critical angle of refraction for the insert. As a result, we can get the formula for the optimal dimensions of the insert to get the maximal intensity of generated nanojet by:

$$W_2 = \tan\Theta_{B2}\left(\frac{W_1}{\tan\Theta_{B1}} - H_1 + H_2\right). \tag{4}$$

It should be noted that if $H_1 \neq H_2$, the total response of the system depends on the side of the electromagnetic wave incidence. It relates to the different position of the edge of insert regarding the edge of the main element (see schematic views for 2 different sides of incidence in FIG. 2). So, such type of elements can be called anisotropic nanojet microlenses.

In the case of electromagnetic wave incidence from the top of the microlens, the optimal dimensions of the insert, to get the maximal intensity of generated nanojet, will be determined as:

$$W_2 = \frac{W_1 \tan\Theta_{B2}}{\tan\Theta_{B1}}. \tag{5}$$

We can see that for electromagnetic wave incidence from the top of the microlens (FIG. 2(b)), the optimal width of the insert does not depend on the height of the constitutive parts.

The dependence of the optimal width of the insert ($W_2$) on the width of the main part ($W_1$) given by the equation (4) for electromagnetic wave incidence from the bottom is presented in FIG. 3, for a system with such parameters: $n_1=1$, $n_2=1.6$, $n_3=1.8$, $H_1=800$ nm. Curves 1-3 correspond to the different heights of the insert: 1–$H_2$=800 nm; 2–$H_2$=600 nm; 3–$H_2$=400 nm.

As it was mentioned before, in the case of an incidence from the top, the optimal $W_2$ will be the same for different $H_2$ and curve 1 will determine the dependence $W_2(W_1)$ in this case as well.

The size of the microlens should have some restrictions in order to observe the intensive nanojet effect. In this way, $W_2$ should be higher than or equal to $\lambda 1/4$, where $\lambda 1=\lambda/n_3$, that is $\lambda 1$ is the length of the wave in the material of the insert. The total size of the system can be up to few wavelengths.

To get the maximal intensity of the nanojet hot spot, a design rule is that we should take the elements for which the total height is close to the focal length ($H_1 \rightarrow F_L$, for example). If the top edge of the insert is higher than the top edge of the main part, in the case of for electromagnetic wave incidence from the bottom of the microlens we should just care about the full height of the insert ($H_2'$). It should be less than the focal length of the insert ($H' < F^{inc}$). For the for electromagnetic wave incidence from the top of the microlens, the optimal width of the insert will be determined as $$W_2 = \tan\Theta_{B2}\left(\frac{W_1}{\tan\Theta_{B1}} - H_1 + H_2'\right). \tag{6}$$

Such a configuration (having a focal spot on the surface of the top layer) can be of a particular interest to a number of applications requiring direct attachment of a lens to a receiving or emitting element, which is to be placed in the focus of the lens.

Let us analyze the data obtained using the electromagnetic field simulation software package CST MICROWAVE STUDIO. The lens (10) is assumed to be in a form of cuboid with the dielectric insert (11) of the same form and is illuminated by a linearly-polarized plane wave E={0,1,0}. All presented simulations were done for 3D problem.

We present below the results for symmetrical systems, that is the insert and the microlens share a same axis of symmetry parallel to the z-axis, as illustrated for example in FIG. 1(a).

FIG. 4 illustrates the power density distribution along z-axis for selected values of $n_3$. The inhomogeneous nanojet lens with $n_1=1$, $n_2=1.6$, $W_1=L_1=300$ nm, $W_2=L_2=150$ nm, $H_1=H_2=400$ nm is illuminated by a plane wave at $\lambda=550$ nm. Dashed curve corresponds to the reference solution for an homogeneous microlens with $n_c=1.6$ without insert.

Evaluating the dependence of the power density distribution along z-axis for different values of refractive index $n_3$ (FIG. 4), we can conclude that the power density in the hot spot of microlens rises with the refractive index of the insert material. The reference solution for a homogeneous microlens without insert is marked by dashed line. It can be seen, that by increasing $n_3$ the hot spot can be shifted closer to the top surface of the system. Starting from $n_3=1.8$, we can observe intensified nanojet hot spot inside the system. In other words, the nanojet hot spot is below the top surface of the system.

As it was mentioned before, in a case of system with optimal dimensions (see equations. (4)-(6)), we can get maximal power density in the nanojet hot spot.

FIG. 5 shows performances of a system with the insert ($H_1=H_2$, $W_1=L_1$, $W_2=L_2$ and $2W_1 \cong \lambda$): FIG. 5(a) illustrates power density distribution along z-axis for selected values of $W_2=L_2$, FIG. 5(b) illustrates power density of nanojet hot spot and FIG. 5(c) illustrates the position of nanojet hot spot as a function of an insert width $W_2$. The inhomogeneous nanojet lens with $n_1=1$, $n_2=1.6$, $n_3=1.8$, $W_1=L_1=300$ nm, $H_1=H_2=400$ nm is illuminated by a plane wave at $\lambda=550$ nm. In FIG. 5(a), dashed light gray curve corresponds to the reference solution for homogeneous microlens with $n_c=1.6$, dashed dark gray curve is for homogeneous microlens with $n_c=1.8$.

In FIG. 5(a), it can be seen that peak power density distribution corresponds to the optimal width $W_{2opt}=150$ nm calculated using equation (4) (FIG. 5b). The increase of the power density for a system with optimal width of the insert in comparison with homogeneous element with $n_2=1.6$ (dashed horizontal line in FIG. 5b) is about 18%. Moreover, it is even higher than the power density for homogeneous element with $n_2=1.8$ (dash-dot black horizontal line in FIG. 5b).

The dependence of the focal spot position on $W_2$ is presented in FIG. 5c, where dashed gray and dashed black curves present dependencies obtained using formulas provided above. Vertical dashed line marks the cross point of this curves. We can conclude that for the system with the insert the focal position will be closer to the surface. Moreover, we have observed the decrease of the nanojet beam width at half power with increase of peak power density.

Similar dependencies for bigger elements ($2W_1 > \lambda$) are presented in FIG. 6. FIG. 6 illustrates performances for a system with the insert ($H_1=H_2$, $W_1=L_1$, $W_2=L_2$). FIG. 6(a) illustrates power density distribution along z-axis for selected values of $W_2=L_2$. FIG. 6(b) illustrates power density of nanojet hot spot and FIG. 6(c) illustrates the position of the nanojet hot spot as a function of an insert width $W_2$. The inhomogeneous nanojet lens with $n_1=1$, $n_2=1.6$, $n_3=1.8$, $W_1=L_1=800$ nm, $H_1=H_2=800$ nm is illuminated by a plane wave at $\lambda=550$ nm.

In FIG. 6(a), dashed light gray curve corresponds to the reference solution for homogeneous microlens with $n_c=1.6$, dashed dark curve is for homogeneous microlens with $n_c=1.8$.

It can be seen that peak power density distribution corresponds to the optimal width $W_{2opt}=400$ nm calculated using equation (4) (FIG. 6b). For the chosen parameters, the increase of the power density for a system with optimal width of the insert in comparison with homogeneous element with $n_2=1.6$ is almost 200%. The dependence of the focal spot position on the $W_2$ has a nonmonotonic character.

It should be noted that due to the high impact of the Fresnel diffraction phenomenon, in the case of bigger elements, some discrepancy between numerical and theoretical results will be observed. Particularly, the power density and hot spot position are quite sensitive to the height of the system (see FIG. 7 for 3 different values of the height of the system and $H_1=H_2$). The dependencies of power density and hot spot position on the wavelength of the incident wave for $2W_1 \cong \lambda$. (FIG. 8) and $2W_1 > \lambda$ (FIG. 9) demonstrate that the system disclosed herein is dispersive.

FIG. 7 illustrates performances for a system with an insert ($H_1=H_2$, $W_1=L_1$, $W_2=L_2$): FIG. 7(a) illustrates power density of nanojet hot spot and FIG. 7(b) illustrates position of nanojet hot spot as a function of an insert width $W_2$. The inhomogeneous nanojet lens with $n_1=1$, $n_2=1.6$, $n_3=1.8$, $W_1=L_1=800$ nm; 1-$H_1=H_2=800$ nm, 2-$H_1=H_2=600$ nm, 3-$H_1=H_2=400$ nm is illuminated by a plane wave at $\lambda=550$ nm.

FIG. 8 illustrates performances for a system with an insert ($H_1=H_2$, $W_1=L_1$, $W_2=L_2$): FIG. 8(a) illustrates power density of nanojet hot spot and FIG. 8(b) illustrates position of nanojet hot spot as a function of the wavelength. The inhomogeneous nanojet lens has such parameters: $n_1=1$, $n_2=1.6$, $n_3=1.8$, $W_1=L_1=300$ nm; $W_2=L_2=100$ nm; 1-$H_1=H_2=400$ nm, 2-$H_1=H_2=300$ nm.

FIG. 9 illustrates performances for a system with the insert ($H_1=H_2$, $W_1=L_1$, $W_2=L_2$): FIG. 9(a) illustrates power density of nanojet hot spot and FIG. 9(b) illustrates position of nanojet hot spot as a function of the wavelength. The inhomogeneous nanojet lens has such parameters: $n_1=1$, $n_2=1.6$, $n_3=1.8$, $W_1=L_1=800$ nm; $W_2=L_2=400$ nm; 1-$H_1=H_2=800$ nm, 2-$H_1=H_2=600$ nm, 3-$H_1=H_2=400$ nm.

As the result of formulas' analysis, we can conclude that properties of inhomogeneous microlens with bottom plane wave incidence depend on the height of the insert ($H_2$). In FIG. 10 we present simulated power density distribution along z-axis for selected values of the height $H_2$ for electromagnetic wave incidence from the bottom (FIG. 10a) and from the top (FIG. 10b) of the system with $2W_1 \cong \lambda$. The inhomogeneous nanojet lens with $n_1=1$, $n_2=1.6$, $n_3=1.8$, $W_1=L_1=300$ nm, $W_2=L_2=150$ nm, $H_1=400$ nm is illuminated by a plane wave at $\lambda=550$ nm. Dashed gray curve in FIG. 10(a,b) corresponds to the reference solution for homogeneous microlens without the insert.

In FIGS. 10(c) and (d), we can see the power density of nanojet hot spot and position of nanojet hot spot for the wave incidence from the bottom and from the top of the system respectively as the functions of the height $H_2$. Curve 1 in FIG. 10(c,d) is for a plane wave incidence from the bottom of microlens, curve 2 in FIG. 10(c,d) is for a plane wave incidence from the top of microlens. We can see that in both cases, the intensity of nanojet beam rises with the height of the insert (peak of power density corresponds to $H_1=H_2$). But for $0<H_2<H_1$ the response of inhomogeneous system depends on the sides of plane wave incidence. Let us note, that increasing the size of the system (see FIG. 11 for $2W_1 > \lambda$) we can increase the discrepancy between the power densities in the hot spots for different sides of the wave incidence and decrease the difference between the positions of nanojet hot spots. FIG. 11(a) illustrates power density of nanojet hot spot and FIG. 11(b) illustrates position of nanojet hot spot as a function of the height $H_2$ for an inhomogeneous nanojet lens with $n_1=1$, $n_2=1.6$, $n_3=1.8$, $W_1=L_1=800$ nm, $W_2=L_2=400$ nm, $H_1=800$ nm illuminated by a plane wave at $\lambda=550$ nm. Curve 1 corresponds to a plane wave incidence from the bottom of microlens, curve 2 is for plane wave incidence from the top of microlens.

We present here below the results for nonsymmetrical systems. FIG. 12(a,b) illustrates power density distribution in the xz-plane at $\lambda=550$ nm for symmetrical (FIG. 12a) and nonsymmetrical (FIG. 12b) microlens. The inhomogeneous microlens has the following parameters: $n_1=1$, $n_2=1.6$, $n_3=1.8$, $W_1=L_1=300$ nm, $H_1=H_2=400$ nm, $W_2=L_2=100$ nm, FIG. 12(a)—$W_s=W_2=100$ nm, FIG. 12(b)—$W_s=250$ nm and is illuminated by a plane wave at $\lambda=550$ nm.

FIG. 12(c) illustrates a cross-section view of an inhomogeneous microlens with nonsymmetrical insert. Here $W_s$ is a position of the left edge of the insert regarding the axis of the symmetry for main element, as illustrated in FIG. 12(c). If $W_s \neq W_2$, the system is nonsymmetrical. In the nonsymmetrical case, slight nanojet beam shift can be observed. Nanojet hot spot shift can be explained by the power density nonequality for the nanojets generated by the bottom edge of the main part. This nonequality relates to additional input of the nanojets generated by the bottom edge of the insert.

It is necessary to note that for $2W_1 \cong \lambda$ the response of the system will just slightly depend on $W_s$. The dependencies of power density along X-axis for opposite sides of electromagnetic wave illumination of an anisotropic inhomogeneous system on different values of $W_s$ are presented in FIG. 13. FIG. 13 illustrates power density distribution along x-axis at $Z_0=510$ nm for selected values of the insert position $W_s$ for an inhomogeneous microlens with the insert for a plane wave incidence from the bottom of microlens (a) and for a plane wave incidence from the bottom of microlens (b). The inhomogeneous nanojet lens with $n_1=1$, $n_2=1.6$, $n_3=1.8$, $W_1=L_1=300$ nm, $W_2=L_2=100$ nm, $H_1=400$ nm, $H_2=300$ nm is illuminated by a plane wave at $\lambda=550$ nm.

We demonstrate that increasing the refractive index $n_3$ for the insert we can increase the discrepancy of the response, as illustrated in FIG. 14 showing power density distribution along x-axis at $Z_0=510$ nm for selected values of the for inhomogeneous microlens with the insert from top (a) and from bottom (b). The inhomogeneous nanojet lens with $n_1=1$, $n_2=1.6$, $W_1=L_1=300$ nm, $W_2=L_2=100$ nm, $H_1=400$ nm, $H_2=300$ nm, $W_s=150$ nm, is illuminated by a plane wave at $\lambda=550$ nm.

The influence of parameter $W_s$ will be much higher for the bigger elements, as illustrated on FIGS. 15-16 for $2W_1 > \lambda$. FIG. 15 illustrates (a)—Z-coordinate of nanojet hot spot; (b)—X-coordinate of nanojet hot spot; and (c)—Power density in nanojet hot spot as a function of insert position $W_s$, for an inhomogeneous nanojet lens with $n_1=1$, $n_2=1.6$, $n_3=1.8$, $W_1=L_1=800$ nm, $W_2=L_2=400$ nm, $H_1=800$ nm, $H_2=400$ nm being illuminated by a plane wave at $\lambda=550$ nm. Curve 1 corresponds to a plane wave incidence from the bottom of microlens, Curve 2 is for plane wave incidence from the top of microlens.

FIG. 16 illustrates (a)—Z-coordinate of nanojet hot spot; (b)—X-coordinate of nanojet hot spot; and (c)—Power density in nanojet hot spot as a function of refractive index on an insert, for an inhomogeneous nanojet lens with $n_1=1$, $n_2=1.6$, $W_1=L_1=800$ nm, $W_2=L_2=400$ nm, $W_s=600$ nm, $H_1=800$ nm, $H_2=400$ nm being illuminated by a plane wave at $\lambda=550$ nm. Curve 1 corresponds to a plane wave incidence from the bottom of microlens, Curve 2 is for plane wave incidence from the top of microlens.

In these FIGS. 15-16, $S_{x,z}$ are the coordinates of the nanojet hot spot. It can be seen, that the response of nonsymmetrical system dramatically depends on the side of the wave incidence.

In the embodiments disclosed above, it is considered that the main part of the microlens and the insert have vertical edges, that is edges parallel to the z axis.

In the following, according to another embodiment, we consider the structures with non-vertical edges and top/bottom surface parallel to xy-plane, that is the base angle of the structure is no more 90°. Let us assume that a is the base angle for the main part of the microlens and a' is the base angle for the insert, as illustrated in FIG. 19 illustrating a cross-section view of an inhomogeneous microlens with an insert. This cross-section view may correspond to the prismatic system embedded in a homogeneous dielectric host media with a refractive index $n_1 < n_2$.

It was obtained that for the systems with non-vertical edges, the nanojets beam radiation angle can be determined using the approximate formula:

$$\theta_{B1} \approx \frac{90° - \theta'_{TIR1}}{2},$$

where $\theta'_{TIR1}$ is the critical angle of refraction from the nonvertical edge. To get the approximate formula for $\theta'_{TIR1}$, the changing of the position of the edge has to be taken into account. As a result, the nanojets beam radiation angle can be estimated for the main part as:

$$\theta_{B1} \approx 90° - \frac{\theta_{TIR1} + \alpha}{2}.$$

In a similar way, the nanojets beam radiation angle for the insert can be determined as:

$$\theta_{B2} \approx \frac{90° - \theta'_{TIR2}}{2}$$

with $\theta'_{TIR2}$ is the critical angle of refraction from the nonvertical edge of the insert. The nanojets beam radiation angle for the insert can thus be estimated as:

$$\theta_{B2} \approx 90° - \frac{\theta_{TIR2} + \alpha'}{2}$$

where a' is the base angle for the insert, which is different from 90° in this embodiment. Thus, for microlenses having structures with non-vertical edges, the optimal base width (bottom width) of the insert $W_2$ can thus be obtained by using the above estimation of the nanojets beam radiation angle for the main part and the insert in eq.(4), (5) or eq.(6) depending on the height of the main part and the insert and on the side of the plane wave incidence.

Let us now consider the effect of the angle of plane wave incidence on the properties of generated nanojets beam. We assume that $\theta_i$ is the angle of electromagnetic wave incidence, as illustrated on FIG. 20 showing the inhomogeneous microlens with oblique plane wave incidence.

To get the approximate formula for nanojets' beam radiation angles in the case of plane wave oblique incidence on the main part with refractive index $n_2$, we should take into account that the radiation angles $\theta'_{B1}$ and $\theta''_{B1}$ for opposite edges of the system are not equal (see FIG. 20). As a result, for the main part we can have:

$$\theta'_{B1} \approx \frac{90° - \theta_{TIR1}}{2} + \frac{\theta_i}{2},$$

$$\theta''_{B1} \approx \frac{90° - \theta_{TIR1}}{2} - \frac{\theta_i}{2},$$

In a similar way, the nanojets beam radiation angles for the insert can be determined as:

$$\theta'_{B2} \approx \frac{90° - \theta_{TIR2}}{2} + \frac{\theta_i}{2},$$

$$\theta''_{B2} \approx \frac{90° - \theta_{TIR2}}{2} - \frac{\theta_i}{2},$$

Thus, in the case of plane wave oblique incidence, the optimal parameters of the system can be obtained from the relation:

$$W_1 \frac{\gamma'_1 \gamma''_1}{\gamma'_1 + \gamma''_1} - H_1 + H_2 = W_2 \frac{\gamma'_2 \gamma''_2}{\gamma'_2 + \gamma''_2}, \text{ where}$$

$$\gamma'_1 = \frac{1}{\tan\Theta'_{B1}}, \gamma''_1 = \frac{1}{\tan\Theta''_{B1}}, \gamma'_2 = \frac{1}{\tan\Theta'_{B2}}, \gamma''_2 = \frac{1}{\tan\Theta''_{B2}}.$$

It is necessary to note that in the case of inclined incidence, to increase the intensity in the nanojet hot spot we should use the nonsymmetrical topology and distance $L_1$ can be determined as $$L_1 = W_1 \frac{\gamma_1''}{\gamma_1' + \gamma_1''} - W_2 \frac{\gamma_2''}{\gamma_2' + \gamma_2''}.$$

Similar results can also be applied for oblique incidence of the plane wave and non-vertical edges of the structures.

Thus, the system disclosed herein works for normal incidence and oblique incidence of the electromagnetic plane wave.

According to an aspect of the present disclosure, an inhomogeneous microlens with at least one insert has been described. Such an inhomogeneous microlens provides:

Nanojet power density enhancement;
Possibility to control the position of the focus of microlens;
Dependence of the response of the system on the side of electromagnetic wave incidence for some topologies;
Simple topology, compatible with established planar micro/nano fabrication methods, e.g. nanoimprinting and photolithography.

The microlens and insert may be designed with different kind of shapes. FIG. 17 illustrates schematic views of possible solutions such as cuboid (FIG. 17(a)) and cylinder (FIG. 17(b)), for an inhomogeneous nanojet microlens with the bottom plane wave incidence. Similar shapes are also possible for inhomogeneous nanojet microlens with the top plane wave incidence.

FIG. 18 illustrates schematic views of possible embodiments of the microlenses with different sizes and positions of the inserts, in the case of a cuboid microlens. For example, the top surface of the insert may correspond to the top surface of the microlens. According to other examples, a part of the insert may exceed the top surface of the microlens.

The height of the insert may equal the height of the microlens, or be lower or higher than the height of the microlens. Also, the length of the insert may be lower than or equals the length of the microlens.

According to another aspect of the present disclosure, such an inhomogeneous microlens can be embedded in a host medium as illustrated in FIG. 17a or 17b or placed on a dielectric substrate acting as a support layer as illustrated in FIG. 21. Material of the substrate can be selected arbitrary: it can be the same or different from the material of the main part of the lens. Implementation of such microstructures is possible via standard lithography techniques.

The structure can be illuminated both from the top or bottom. To provide the desired focusing function, material properties and dimensions of the constitutive parts must be adjusted accordingly. The dielectric material of the main part of the microlens and/or of the insert may be for example glass, plastic, or a polymer material.

The inhomogeneous microlens disclosed above can be used for example in optical sensors. The inventors have demonstrated that using such type of focusing elements can improve the light capture efficiency (LCE) of the pixels due to the increased intensity of generated nanojet beam. The investigation of nonsymmetrical position of the insert can be used for the estimation of possible tolerance. Moreover, the possibility to shift the nanojet beam can help to resolve the crosstalk problem between the neighboring pixels.

Thanks to the miniature dimensions of the microlense, they can be effectively used with pixels having dimensions as small as about 2 microns or even smaller. In such a scenario, nanojet lenses can replace the conventional refractive microlenses. For pixels having larger dimensions (e.g. 2 to 8 um or larger), nanojet microlenses can be used in combination with refractive lenses. Finally, in case of an irregular pixel (having a non-symmetrical or shifted light sensitive region), the shape and position of the nanojet lens can be adjusted accordingly by changing the position of the insert.

The invention claimed is:

1. An optical device for near-field focusing and beam forming, said device being configured to form, in a near field zone at a second surface of the device opposite to a first surface of the device, a field intensity distribution from an incident electromagnetic wave of visible light at the surface of said device, wherein said device is embedded in a first dielectric material having a first refractive index $n_1$, said device comprising:

a main part, said main part made of a second dielectric material having a second refractive index $n_2$,
wherein said second refractive index $n_2$ is higher than said first refractive index $n_1$; and
at least one insert, said at least one insert made of a third dielectric material having a third refractive index $n_3$ that is higher than said second refractive index $n_2$,
wherein said at least one insert is at least partially within said main part, said first refractive index $n_1$ being different from said third refractive index $n_3$,
wherein $$W_1 \geq \frac{\lambda_1}{4},$$

with $W_1$ being a half width of said main part and $\lambda_1$ being a first wavelength of the incident electromagnetic wave of visible light in said main part,
wherein $$W_2 \geq \frac{\lambda_2}{4}$$

with $W_2$ being a half width of said at least one insert and $\lambda_2$ being a second wavelength of the incident electromagnetic wave of visible light in said at least one insert,
wherein the incident electromagnetic wave of visible light at the first surface of the optical device is guided by opposite first edges of the main part of the optical device to form a first nanojet beam having a focal point in the near field zone at the second surface of the optical device, the first nanojet beam being formed from a crossing, at the focal point, of individual first nanojet beams from each of the opposite first edges of the main part, and
wherein the incident electromagnetic wave of visible light at the first surface of the optical device is guided by opposite second edges of the at least one insert to form a second nanojet beam at the focal point in the near field zone at the second surface of the optical device, the second nanojet beam being formed from a crossing, at the focal point, of individual second nanojet beams from each of the opposite second edges of the at least one insert, the first and the second nanojet beam thereby forming a single high-intensity nanojet beam at the focal point in the near field zone at the second surface of the optical device.

2. The optical device according to claim 1, wherein, in an X, Y, Z coordinate system, where the first surface corresponds to a bottom surface of said device and the second surface corresponds to a top surface of the device, and when, at the top surface, a top edge of said at least one insert is above or coincides with a top edge of said main part, said half-width $W_2$ of said at least one insert is given by:

$$W_2 \approx \tan\theta_{B2} \times \left(\frac{W_1}{\tan\theta_{B1}} - H_1 + H_2\right),$$

where $H_1$ corresponds to a first height of said main part and $H_2$ corresponds to a second height of said at least one insert, where $\theta_{B2}$ is given by:

$$\theta_{B2} \approx \frac{90° - \sin^{-1}\left(\frac{n_2}{n_3}\right)}{2},$$

and where $\theta_{B1}$ is given by:

$$\theta_{B1} \approx \frac{90° - \sin^{-1}\left(\frac{n_1}{n_2}\right)}{2}.$$

3. The optical device according to claim 1, wherein, in an X, Y, Z coordinate system, where the first surface corresponds to a top surface of said optical device and the second surface corresponds to a bottom surface of the optical device, and when, at the top surface, a top edge of said at least one insert is above or coincides with a top edge of said main part, said half-width $W_2$ of said at least one insert is given by:

$$W_2 \approx \tan\theta_{B2} \times \left(\frac{W_1}{\tan\theta_{B1}}\right),$$

where $\theta_{B2}$ is given by:

$$\theta_{B2} \approx \frac{90° - \sin^{-1}\left(\frac{n_2}{n_3}\right)}{2},$$

and where $\theta_{B1}$ is given by:

$$\theta_{B1} \approx \frac{90° - \sin^{-1}\left(\frac{n_1}{n_2}\right)}{2}.$$

4. An optically-transparent device according to claim 1, wherein each of a shape of said main part and a shape of said at least one insert is selected from the group consisting of: a cuboid, a cylinder, a cone, and a prism.

5. An optically-transparent device according to claim 1, wherein each of said main part and said at least one insert has a shape with non-vertical lateral surfaces.

6. An optically-transparent device according to claim 1, wherein a top edge of said at least one insert coincides with a top edge of said main part and a first height of said at least one insert equals to a second height of said main part.

7. An optically-transparent device according to claim 1, wherein said main part and said at least one insert share at least one same axis of symmetry.

8. An optically-transparent device according to claim 1, wherein a first axis of symmetry perpendicular to a top surface of said at least one insert is shifted from a second axis of symmetry perpendicular to a top surface of said main part.

9. The optical device according to claim 1, wherein said second dielectric material of said main part or said third dielectric material of said at least one insert is selected from the group consisting of: glass, plastic, and a polymer material.

10. A system comprising:
  a dielectric host medium with a first refractive index $n_1$;
  an optical device for near-field focusing and beam forming,
    wherein the optical device is configured to form, in a near field zone at a second surface of the optical device opposite to a first surface of the optical device, a field intensity distribution from an incident electromagnetic wave of visible light at the first surface of the optical device, and
    wherein the optical device is embedded in said dielectric host medium, said optical device comprising:
      a main part, said main part is made of a second dielectric material having a second refractive index $n_2$,
        wherein said second refractive index $n_2$ is higher than said first refractive index $n_1$; and
      at least one insert, said at least one insert made of a third dielectric material having a third refractive index $n_3$ that is higher than said second refractive index $n_2$,
        wherein said at least one insert is at least partially within said main part, said first refractive index ni being different from said third refractive index $n_3$,
      wherein $$W_1 \geq \frac{\lambda_1}{4},$$

with $W_1$ being a halt width of said main part and $\lambda_1$ being a first wavelength of the incident electromagnetic wave in said main part, and
      wherein $$W_2 \geq \frac{\lambda_2}{4},$$

with $W_2$ being a half width of said at least one insert and $\lambda_2$ being a second wavelength of the incident electromagnetic wave in said at least one insert; and
      a support layer made of a dielectric substrate with a fourth refractive index $n_4$,
        wherein said optical device is on said support layer,
        wherein the incident electromagnetic wave of visible light at the first surface of the optical device is guided by opposite first edges of the main part of the optical device to form a first nanojet beam having a focal point in the near field zone at the second surface of the optical device, the first nanojet beam being formed from a crossing, at the focal point, of individual first nanojet beams from each of the opposite first edges of the main part, and
        wherein the incident electromagnetic wave of visible light at the first surface of the optical device is guided by opposite second edges of the at least one insert to form a second nanojet beam at the focal point in the near field zone at the second surface of the optical device, the second nanojet beam being formed from a crossing, at the focal point, of individual second nanojet beams from each of the opposite second edges of the at least one insert, the first and the second nanojet beam thereby forming a single high-intensity nanojet beam at the focal point in the near field zone at the second surface of the optical device.

11. An optical sensor device, comprising:
a first dielectric material having a first refractive index $n_1$; and
an optical device for near-field focusing and beam forming,
wherein the optical device is configured to form, in a near field zone at a second surface of the optical device opposite to a first surface of the optical device, a field intensity distribution from an incident electromagnetic wave of visible light at the first surface of said optical device, and
wherein said optical device is embedded in said first dielectric material, said optical device comprising:
a main part, said main part made of a second dielectric material having a second refractive index $n_2$,
wherein said second refractive index $n_2$ is higher than said first refractive index $n_1$; and
at least one insert, said at least one insert made of a third dielectric material having a third refractive index $n_3$ that is higher than said second refractive index $n_2$,
wherein said at least one insert is at least partially within said main part, said first refractive index $n_1$ being different from said third refractive index $n_3$, wherein $$W_1 \geq \frac{\lambda_1}{4},$$

with $W_1$ being a half width of said main part and $\lambda_1$ being a first wavelength of the incident electromagnetic wave of visible light in said main part, and
wherein $$W_1 \geq \frac{\lambda_1}{4},$$

with $W_2$ being a half width of said at least one insert and $\lambda_2$ being a second wavelength of the incident electromagnetic wave of visible light in said at least one insert,
wherein the incident electromagnetic wave of visible light at the first surface of the optical device is guided by opposite first edges of the main part of the optical device to form a first nanojet beam having a focal point in the near field zone at the second surface of the optical device, the first nanojet beam being formed from a crossing, at the focal point, of individual first nanojet beams from each of the opposite first edges of the main part, and
wherein the incident electromagnetic wave of visible light at the first surface of the optical device is guided by opposite second edges of the at least one insert to form a second nanojet beam at the focal point in the near field zone at the second surface of the optical device, the second nanojet beam being formed from a crossing, at the focal point, of individual second nanojet beams from each of the opposite second edges of the at least one insert, the first and the second nanojet beam thereby forming a single high-intensity nanojet beam at the focal point in the near field zone at the second surface of the optical device.

12. The system according to claim 10, wherein, in an X, Y, Z coordinate system, where the first surface corresponds to a bottom surface of said optical device and the second surface corresponds to a top surface of the optical device, and when, at the top surface, a top edge of said insert is above or coincides with a top edge of said main part, said half-width $W_2$ of said one at least one insert is given by:

$$W_2 \approx \tan\theta_{B2} \times \left(\frac{W_1}{\tan\theta_{B1}} - H_1 - + H_2\right),$$

where $H_1$ corresponds to a first height of said main part and $H_2$ corresponds to a second height of said at least one insert, $\theta_{B2}$ is given by:

$$\theta_{B2} \approx \frac{90° - \sin^{-1}\left(\frac{n_2}{n_3}\right)}{2},$$

and where $\theta_{B1}$ is given by:

$$\theta_{B1} \approx \frac{90° - \sin^{-1}\left(\frac{n_1}{n_2}\right)}{2}.$$

13. The system according to claim 10, wherein, in an X, Y, Z coordinate system, where the first surface corresponds to a top surface of said optical device and the second surface corresponds to a bottom surface of the optical device, and when, at the top surface, a top edge of said at least one insert is above or coincides with a top edge of said main part, said half-width $W_2$ of said at least one insert is given by:

$$W_2 \approx \tan\theta_{B2} \times \left(\frac{W_1}{\tan\theta_{B1}}\right),$$

where $\theta_{B2}$ is given by:

$$\theta_{B2} \approx \frac{90° - \sin^{-1}\left(\frac{n_2}{n_3}\right)}{2},$$

and where $\theta_{B1}$ is given by:

$$\theta_{B1} \approx \frac{90° - \sin^{-1}\left(\frac{n_1}{n_2}\right)}{2}.$$

14. The system according to claim 10, wherein said half-width $W_2$ of said at least one insert depends at least in part on (i) said half-width $W_1$ of said main part and (ii) a first ratio between said second and third refractive indexes $n_2$ and $n_3$ and a second ratio between said first and second refractive indexes $n_1$ and $n_2$.

15. A system according to claim 10, wherein each of said main part and said at least one insert has a shape with non-vertical lateral surfaces.

16. The optical sensor device according to claim 11, wherein, in an X, Y, Z coordinate system, where the first surface corresponds to a bottom surface of said optical device and the second surface corresponds to a top surface of the device, and when, at the top surface, a top edge of said at least one insert is above or coincides with a top edge of said main part, said half-width $W_2$ of said at least one insert is given by:

$$W_2 \approx \tan\theta_{B2} \times \left(\frac{W_1}{\tan\theta_{B1}} - H_1 + H_2\right),$$

where $H_1$ corresponds to a first height of said main part and $H_2$ corresponds to a second height of said at least one insert, $\theta_{B2}$ is given by:

$$\theta_{B2} \approx \frac{90° - \sin^{-1}\left(\frac{n_2}{n_3}\right)}{2},$$

and where $\theta_{B1}$ is given by:

$$\theta_{B1} \approx \frac{90° - \sin^{-1}\left(\frac{n_1}{n_2}\right)}{2}.$$

17. The optical sensor device according to claim 11, wherein, in an X, Y, Z coordinate system, where the first surface corresponds to a top surface of said optical device and the second surface corresponds to a bottom surface of the optical device, and when, at the top surface, a top edge of said at least one insert is above or coincides with a top edge of said main part, said half-width $W_2$ of said at least one insert is given by:

$$W_2 \approx \tan\theta_{B2} \times \left(\frac{W_1}{\tan\theta_{B1}}\right),$$

where $\theta_{B2}$ is given by:

$$\theta_{B2} \approx \frac{90° - \sin^{-1}\left(\frac{n_2}{n_3}\right)}{2},$$

and where $\theta_{B1}$ is given by:

$$\theta_{B1} \approx \frac{90° - \sin^{-1}\left(\frac{n_1}{n_2}\right)}{2}.$$

18. An optical sensor device according to claim 11, wherein each of said main part and said at least one insert has a shape with non-vertical lateral surfaces.

19. The optical sensor device according to claim 11, wherein said half-width $W_2$ of said at least one insert depends at least in part on (i) said half-width $W_1$ of said main part and (ii) a first ratio between said second and third refractive indexes $n_2$ and $n_3$ and a second ratio between said first and second refractive indexes $n_1$ and $n_2$.

20. The optical device according to claim 1, wherein said half-width $W_2$ of said at least one insert depends at least in part on (i) said half-width $W_1$ of said main part and (ii) a first ratio between said second and third refractive indexes $n_2$ and $n_3$ and a second ratio between said first and second refractive indexes $n_1$ and $n_2$.

* * * * *